(12) United States Patent
Kondo et al.

(10) Patent No.: US 7,421,117 B2
(45) Date of Patent: Sep. 2, 2008

(54) COLOR COMPRESSION APPARATUS AND COLOR COMPRESSION METHOD

(75) Inventors: Masaki Kondo, Toyoake (JP); Yasunari Yoshida, Aichi-ken (JP); Masashi Ueda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 913 days.

(21) Appl. No.: 10/671,509

(22) Filed: Sep. 29, 2003

(65) Prior Publication Data

US 2004/0071340 A1 Apr. 15, 2004

(30) Foreign Application Priority Data

Sep. 30, 2002 (JP) ............................. 2002-285736

(51) Int. Cl.
*G06K 9/00* (2006.01)
(52) U.S. Cl. ..................... 382/166; 382/162; 382/167
(58) Field of Classification Search ............... 382/162, 382/165, 166, 167; 358/1.9, 527, 518; 348/649; 345/590
See application file for complete search history.

(56) References Cited

U.S. PATENT DOCUMENTS

| | | | | |
|---|---|---|---|---|
| 5,268,753 | A * | 12/1993 | Yamaguchi | 358/527 |
| 5,734,745 | A * | 3/1998 | Ohneda | 382/167 |
| 5,933,253 | A | 8/1999 | Ito et al. | 358/500 |
| 6,268,930 | B1 * | 7/2001 | Ohta et al. | 358/1.9 |
| 6,340,975 | B2 * | 1/2002 | Marsden et al. | 345/590 |
| 6,560,356 | B1 * | 5/2003 | Takahashi et al. | 382/162 |
| 6,882,445 | B1 * | 4/2005 | Takahashi et al. | 358/1.9 |
| 7,116,441 | B1 * | 10/2006 | Matsuoka | 358/1.9 |
| 7,167,275 | B2 * | 1/2007 | Fukasawa | 358/1.9 |

FOREIGN PATENT DOCUMENTS

| | | |
|---|---|---|
| JP | A 63-254888 | 10/1988 |
| JP | A 3-13066 | 1/1991 |
| JP | A 9-98298 | 4/1997 |

* cited by examiner

*Primary Examiner*—Anh Hong Do
(74) *Attorney, Agent, or Firm*—Oliff & Berridge, PLC

(57) ABSTRACT

According to a hue conversion, hue angles of C, M, and Y are always set to hue angles HC, HM, and HY of C, M, and Y of a printer, hue angles of R and G are always set to hue angles HR and HG of R and G of a monitor, and the hue angle of B is always set to a value HB desired by a user. The gradation from black through a full color to white is made linear in each color of R, G, B, C, M, and Y according to the hue conversion. The user sets the hue angle HB for B. Therefore, the user can obtain blue color B which provides the user's favorite hue and gradation. Every hue can be reproduced excellently and gradations can be reproduced without color shifts.

30 Claims, 9 Drawing Sheets

SIGMOID FUNCTION

COLOR COMPRESSION APPARATUS AND COLOR COMPRESSION METHOD

BACKGROUND OF THE INVENTION

1. Field of the Invention

The present invention relates to a color compression method and a color compression apparatus used to reproduce colors between devices having different color gamuts.

2. Description of Related Art

To reproduce colors between devices having different color gamuts, a color compression method of keeping hue has been utilized. For example, U.S. Pat. No. 5,933,253 proposes a technique of converting lightness and chroma in a two-dimensional lightness-chroma plane constituted by lightness and hue.

SUMMARY OF THE INVENTION

However, even when device-color values (RGB, CMYK, or the like) on two different devices have equal values, the device-color values on the two different devices generally have different hue values in the uniform color space ($L^*a^*b^*$, $L^*u^*v^*$, or the like.) For example, blue reproduced by a monitor in response to an RGB signal (0, 0, 255) indicative of blue full color is reproduced to be more reddish by a printer that is controlled in response to a CMYK control signal (255, 255, 0, 0) that is also indicative of blue full color.

Additionally, in a monitor profile such as sRGB or the like, an equal hue line is not linear in the uniform color space such as $L^*a^*b^*$, $L^*u^*v^*$, or the like.

It is now assumed that a plurality of colors for each of six primary colors of C, M, Y, R, G, and B are produced by controlling a monitor with a plurality of RGB control signals (R, G, B) indicative of a corresponding gradation (black to a corresponding full color to white). A set of $L^*a^*b^*$ value ($L^*$, $a^*$, $b^*$) is measured for a color produced by each RGB control signal, and the $L^*a^*b^*$ value set is plotted onto the $L^*a^*b^*$ plane. FIG. 1(a) shows how the $L^*a^*b^*$ value sets are distributed in the $L^*a^*b^*$ space when observed from the maximum $L^*$ value along the L-axis. In other words, FIG. 1(a) shows how $a^*b^*$ values ($a^*$, $b^*$) in the $L^*a^*b^*$ value sets ($L^*$, $a^*$, $b^*$) are distributed in the $a^*b^*$ plane.

More specifically, in order to create the gradation line for R in FIG. 1(a), 511 RGB control signals (R, G, B) are prepared, in which only the value R increases sequentially from 0 to 255 while G and B are kept being equal to zero and then values G and B increase sequentially from 0 to 255 while G and B are kept being equal to each other and while R is kept being equal to 255. Thus, the 511 RGB control signals (R, G, B) include: (0, 0, 0) (black), (1, 0, 0), ... (254, 0, 0), (255, 0, 0) (red full color), (255, 1, 1,) ..., (255, 254, 254), and (255, 255, 255) (white). Thus, 511 colors are displayed by the monitor. A Lab value set (L,a,b) is measured for each color, and the point (a, b) expressed by values $a^*$ and $b^*$ are plotted on the ab-plane. Thus created is an equal-hue line R which extends from the origin on the $L^*$ axis (black (0, 0, 0)) through the red full color (255, 0, 0) and returns again to the origin on the $L^*$ axis (white (255, 255, 255)). The equal-hue line R should have a predetermined amount of hue H for red, and therefore should extend linearly from the origin in the direction at the predetermined hue H (angle from the $a^*$-axis). However, as is apparent from FIG. 1(a), the line is looped. In other words, the line extends with a changing hue H. It is understood that the red gradation cannot be reproduced correctly.

The gradation lines for G, B, C, M, and Y are produced in a similar manner as described for the gradation line for R except for the points described below.

In order to create the gradation line for G in FIG. 1(a), 511 RGB control signals (R, G, B) are prepared, in which only the value G increases sequentially from 0 to 255 while R and B are kept being equal to zero and then values R and B increase sequentially from 0 to 255 while R and B are kept being equal to each other and while G is kept being equal to 255. The 511 RGB control signals (R, G, B) therefore include: (0, 0, 0) (black), (0, 1, 0), ... (0, 254, 0), (0, 255, 0) (green full color), (1, 255, 1) ..., (254, 255, 254), and (255, 255, 255) (white).

In order to create the gradation line for B, 511 RGB control signals (R, G, B) are prepared, in which only the value B increases sequentially from 0 to 255 while R and G are kept being equal to zero and then values R and G increase sequentially from 0 to 255 while R and G are kept being equal to each other and while B is kept being equal to 255. Thus, the 511 RGB control signals (R, G, B) include: (0, 0, 0) (black), (0, 0, 1), ... (0, 0, 254), (0, 0, 255) (blue full color), (1, 1, 255) ..., (254, 254, 255), and (255, 255, 255) (white).

In order to create the gradation line for C, 511 RGB control signals (R, G, B) are prepared, in which the values G and B increase sequentially from 0 to 255 while G and B are kept being equal to each other and while R is kept being equal to zero and then value R increases sequentially from 0 to 255 while G and B are kept being equal to 255. Thus, the 511 RGB control signals (R, G, B) include: (0, 0, 0) (black), (0, 1, 1), ... (0, 254, 254), (0, 255, 255) (cyan full color), (1, 255, 255) ..., (254, 255, 255), and (255, 255, 255) (white).

In order to create the gradation line for M, 511 RGB control signals (R, G, B) are prepared, in which the values R and B increase sequentially from 0 to 255 while R and B are kept being equal to each other and while G is kept being equal to zero and then value G increases sequentially from 0 to 255 while R and B are kept being equal to 255. Thus, the 511 RGB control signals (R, G, B) include: (0, 0, 0) (black), (1, 0, 1), ... (254, 0, 254), (255, 0, 255) (magenta full color), (255, 1, 255) ..., (255, 254, 255), and (255, 255, 255) (white).

In order to create the gradation line for Y, 511 RGB control signals (R, G, B) are prepared, in which the values R and G increase sequentially from 0 to 255 while R and G are kept being equal to each other and while B is kept being equal to zero and then value B increases sequentially from 0 to 255 while R and G are kept being equal to 255. Thus, the 511 RGB control signals (R, G, B) include: (0, 0, 0) (black), (1, 1, 0), ... (254, 254, 0), (255, 255, 0) (yellow full color), (255, 255, 1) ..., (255, 255, 254), and (255, 255, 255) (white).

As is apparent from FIG. 1(a), each of equal-hue lines Y, G, C, and M extends substantially linearly from the origin with a corresponding fixed amount of hue. However, equal-hue lines R and B are looped. That is, the equal-hue lines R and B extend with a changing amount of hue. Therefore, proper gradation cannot be reproduced for red and blue.

FIG. 1(b) shows a monitor color gamut Sm and a printer color gamut Sp in a lightness-chroma plane with some hue. The lightness-chroma plane is a cross-section of the three-dimensional $L^*a^*b^*$ space at some hue, and therefore is a two-dimensional plane consisting of lightness and chroma.

As shown in this figure, the monitor color gamut Sm shifts in the brighter direction from the printer color gamut Sp along the axis of lightness $L^*$ on the lightness-chroma plane for the present hue. Therefore, the color on the monitor and the color printed by the printer give different impressions at the present hue.

In view of the above-described drawbacks, a first object of the present invention is to provide a color compression method and a color compression apparatus which prevent hue shifts on each gradation and which are capable of reproducing each gradation properly.

A second object of the present invention is to provide a color compression method and a color compression apparatus which eliminate difference in color impression between two devices, which is caused by difference in lightness between the two devices.

In order to attain the above and other objects, the present invention provides a color compression apparatus, comprising: an input portion receiving input color image data which is defined for an input-end device and which is located in a predetermined input-end gamut; and a color compression portion converting the input color image data into output color image data which is defined for an output-end device and which is located in a predetermined output-end gamut, the color compression portion including a hue determining portion determining hue of the input color image data based on the input color image data.

According to another aspect, the present invention provides a color compression apparatus, comprising: an input portion receiving input color image data which is defined for an input-end device and which is located in a predetermined input-end gamut; and a color compression portion converting the input color image data into output color image data which is defined for an output-end device and which is located in a predetermined output-end gamut, the color compression portion including: a hue determining portion determining hue Hin of the input color image data; a lightness determining portion determining lightness Vin of the input color image data; and a lightness correcting portion correcting the lightness Vin; the input-end gamut having a full-color lightness V0 at the hue Hin, and the output-end gamut having a full-color lightness V02 at the hue Hin, the lightness correcting portion including a target lightness determining portion determining, based on a difference between the values V0 and V02, a target lightness "target" indicative of a full-color lightness of a corrected input-end gamut at the hue Hin, the lightness correcting portion correcting the lightness Vin based on the target lightness "target".

According to another aspect, the present invention provides a color compression method, comprising: receiving input color image data which is defined for an input-end device and which is located in a predetermined input-end gamut; and converting the input color image data into output color image data which is defined for an output-end device and which is located in a predetermined output-end gamut, the color compression step including: determining hue of the input color image data based on the input color image data.

According to another aspect, the present invention provides a color compression method, comprising: receiving input color image data which is defined for an input-end device and which is located in a predetermined input-end gamut; and converting the input color image data into output color image data which is defined for an output-end device and which is located in a predetermined output-end gamut, the color compression step including: determining hue Hin of the input color image data; determining lightness Vin of the input color image data; and correcting the lightness Vin; the input-end gamut having a full-color lightness V0 at the hue Hin, and the output-end gamut having a full-color lightness V02 at the hue Hin, the lightness correcting step including: determining, based on a difference between the values V0 and V02, a target lightness "target" indicative of a full-color lightness of a corrected input-end gamut at the hue Hin, the lightness correcting step correcting the lightness Vin based on the target lightness "target".

BRIEF DESCRIPTION OF THE DRAWINGS

The above and other objects, features and advantages of the invention will become more apparent from reading the following description of the preferred embodiments taken in connection with the accompanying drawings in which:

FIGS. 6(a) and 6(b) are explanatory views showing how to set a target lightness value in a lightness-chroma plane during a lightness conversion step in the color compression processing in FIG. 3, wherein FIG. 6(a) shows a state where the difference between the full color lightness value V0 in the monitor color gamut Sm and the full color lightness value V02 in the printer color gamut Sp is relatively small, and FIG. 6(b) shows a state where the difference between V0 and V02 is relatively large;

DETAILED DESCRIPTION OF THE PREFERRED EMBODIMENT

Figure 1:
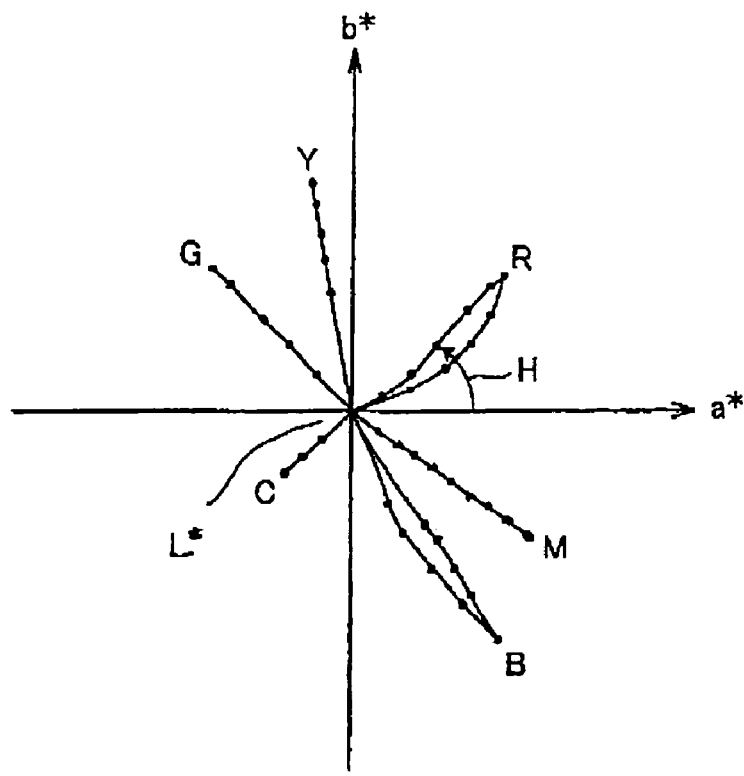
FIG. 1(a) is an explanatory view showing an a*b* plane, on which L*a*b* values on gradations of C, M, Y, R, G, and B primary colors defined by RGB control signals for a monitor are plotted.
FIG. 1(b) is an explanatory view showing gamuts of the monitor and of the printer on a lightness-chroma plane.
Figure 1:
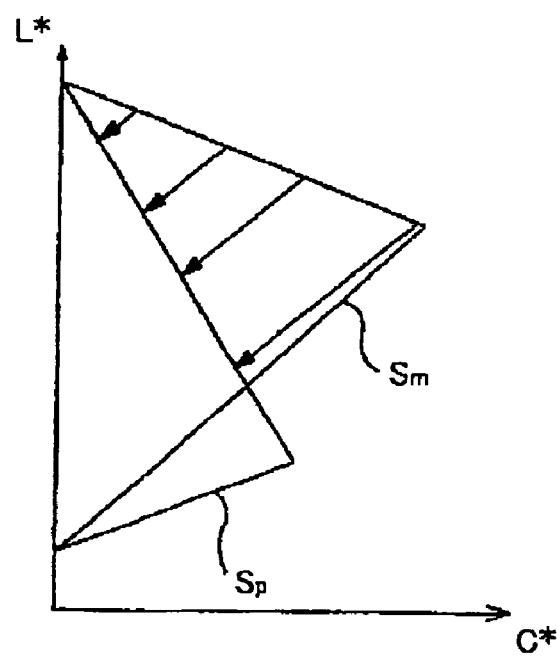

A color compression apparatus and a color compression method according to a preferred embodiment of the present invention will be described while referring to the accompanying drawings wherein like parts and components are designated by the same reference numerals to avoid duplicating description.

Figure 2:
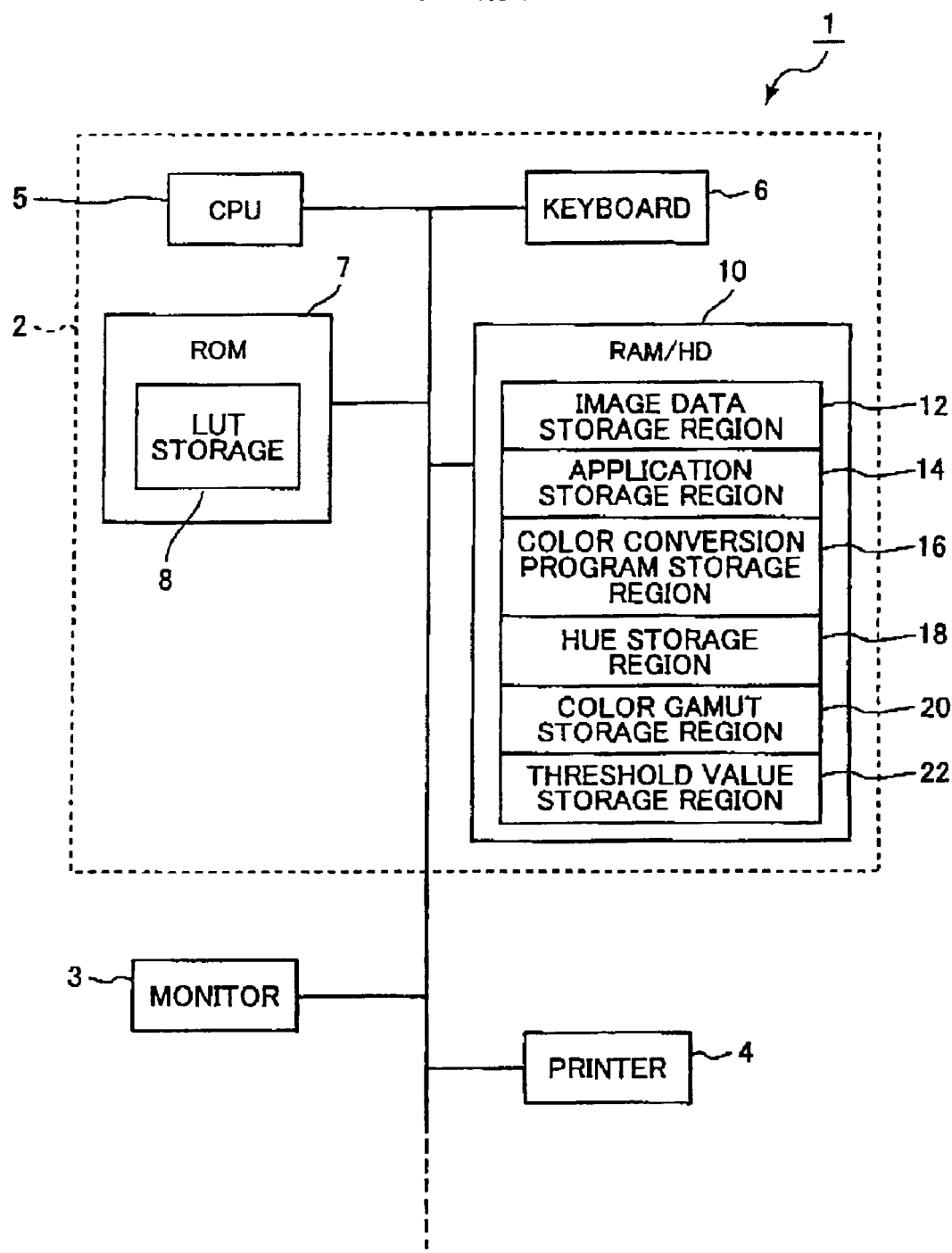
FIG. 2 is a schematic block diagram showing an image forming system according to a preferred embodiment of the present invention.

FIG. 2 shows a schematic block diagram of an image forming system in the preferred embodiment of the present invention. The image forming system 1 includes a personal computer 2 serving as a color compression apparatus according to the present embodiment. The personal computer 2 is connected with a monitor 3 and a printer 4. The monitor 3 and printer 4 each are of a type capable of processing color images.

The monitor 3 is controlled by RGB control signals (R, G, B) to display images. Each of color components R, G, and B of the RGB control signals has a gradation value of 8 bits (0 to 255) where 255 indicates a light emitting state (i.e., a bright state) and 0 indicates non light emitting state (i.e., a dark state). The monitor 3 displays a color image by means of three primary color signals of red (R), green (G), and blue (B) in accordance with the RGB control signals (R, G, B) (where $0 \leqq R \leqq 255$, $0 \leqq G \leqq 255$, $0 \leqq B \leqq 255$). The monitor 3 reproduces colors within the color gamut Sm of the monitor 3 by means of total 256×256×256 RGB control signals (R, G, B).

The printer 4 is controlled by CMYK control signals (C, M, Y, K) to print the image displayed on the monitor 3. Each of color components C, M, Y, and K of the CMYK control signals (C, M, Y, K) has a gradation value (0 to 255) of 8 bits where 255 indicates coloring with use of a coloring material (i.e., a dark state) and 0 indicates non coloring (i.e., a bright state). The printer 4 prints out a color image by means of four primary color signals of cyan (C), magenta (M), yellow (Y), and black (K) in accordance with the CMYK control signals (C, M, Y, K) (where $0 \leqq C \leqq 255$, $0 \leqq M \leqq 255$, $0 \leqq Y \leqq 255$, $0 \leqq K \leqq 255$). The printer 4 reproduces colors within the color gamut Sp of the printer 4 by means of total 256×256×256×256 CMYK control signals (C, M, Y, K).

The personal computer 2 includes a read-only storage (ROM) 7, a randomly readable/writable storage (RAM and hard disk) 10, a CPU 5, and a keyboard 6.

The read-only storage (ROM) 7 stores, in advance, basic programs to be executed by the personal computer 2. The read-only storage (ROM) 7 is provided with a LUT storage 8.

The LUT storage 8 stores, in advance, a look-up table LUTm which shows color conversion characteristics of the monitor 3, and a look-up table LUTp which shows color conversion characteristics of the printer 4.

The LUTm is prepared in a manner described below. The monitor 3 is controlled by plural RGB control signals (R, G, B), and the colors displayed on the basis of the respective RGB control signals are measured to obtain Lab values (L*, a*, b*). The LUTm stores, as an input-end profile, the relationships between plural sets of (R, G, B) and corresponding sets of (L*, a*, b*).

The LUTp is prepared in a similar manner. That is, the printer 4 is controlled by plural CMYK control signals (C, M, Y, K), and the colors printed on the basis of the respective CMYK control signals are measured to obtain Lab values (L*, a*, b*). The LUTp stores, as an output-end profile, the relationships between plural sets of (C, M, Y, K) and corresponding sets of (L*, a*, b*).

The randomly readable/writable storage 10 includes a hard disk and a RAM In the randomly readable/writable storage 10, there are formed an image data storage region 12, an application storage region 14, a color conversion program storage region 16, a hue storage region 18, a color gamut storage region 20, and a threshold value storage region 22.

The image data storage region 12 stores image data to be displayed on the monitor 3.

The application storage region 14 stores application software to be executed by the personal computer 2.

The color conversion program storage region 16 stores a color compression program (color conversion program) which will be described later with reference to FIG. 3.

In one exemplary embodiment, color gamut storage region 20 stores a predetermined input-end gamut, for example, data of the color gamut Sm of the monitor 3 and, and a predetermined output-end gamut, for example, data of the color gamut Sp of the printer 4.

The color gamut Sm has the maximum lightness value Vmax and the minimum lightness value Vmin on the lightness axis V. The color gamut Sm has, on each of all the lightness-chroma planes (equal-hue planes) having hue values H from 0° to 360°, the maximum chroma value Cmax in correspondence with each of all the lightness values V between Vmax and Vmin. On the lightness-chroma plane at each hue H, the color gamut Sm has, as a full color lightness value V0 for the subject hue H, one lightness value V that corresponds to the maximum value among all the maximum chroma values Cmax. The color gamut Sm attains, at each hue H, the maximum chroma (the most vivid color) at a corresponding full color lightness value V0. The full color lightness value V0 of the color gamut Sm changes according to the hue value H.

Similarly, the color gamut Sp has the maximum lightness value Vmax and the minimum lightness value Vmin on the lightness axis V. The color gamut Sp has, on each of all the lightness-chroma planes (equal-hue planes) having hue values H from 0° to 360°, the maximum chroma value CT in correspondence with each of all the lightness values V between Vmax and Vmin. On the lightness-chroma plane at each hue H, the color gamut Sp has, as a full color lightness value V02 for the subject hue H, one lightness value V that corresponds to the maximum value among all the maximum chroma values CT. The color gamut Sp attains, at each hue H, the maximum chroma (the most vivid color) at a corresponding full color lightness value V02. The full color lightness value V02 of the color gamut Sp changes according to the hue value H.

The color gamut storage region 20 stores data of the color gamut Sm. The data of the color gamut Sm includes: data of the maximum lightness value Vmax of the color gamut Sm, the minimum lightness value Vmin of the color gamut Sm, the maximum chroma values Cmax of the color gamut Sm in correspondence with all the lightness values v on the lightness-chroma plane at each of all the hue values H, and the full color lightness value V0 of the color gamut Sm on the lightness-chroma plane at each of all the hue values H.

The color gamut storage region 20 further stores data of the color gamut Sp. The data of the color gamut Sp includes: data of the maximum lightness value Vmax of the color gamut Sp, the minimum lightness value Vmin of the color gamut Sp, the maximum chroma values CT of the color gamut Sp in correspondence with all the lightness values V on the lightness-chroma plane at each of all the hue values H, and the full color lightness value V02 of the color gamut Sp on the lightness-chroma plane at each of all the hue values H.

The hue storage region 18 stores hue values (hue angles) HR, HG, HC, HM, and HY that respectively correspond to the primary colors of red, green, cyan, magenta, and yellow, HR and HG indicate the hue values of the primary colors red and green displayed on the monitor 3. The hue values HR and HG are obtained as described below.

The monitor 3 is supplied with (255, 0, 0) as a RGB control signal. The color displayed on the monitor 3 is then measured by a calorimeter to obtain a calorimetric value (L*, a*, b*) thereof. Based on the values a* and b*, an equation of $H=\arctan(b^*/a^*)*180/\pi$ is calculated. The calculation result thereof is set as HR.

The monitor 3 is supplied with (0, 255, 0) as a RGB control signal. The color displayed on the monitor 3 is then measured by a calorimeter to obtain a colorimetric value (L*, a*, b*) thereof. Based on the values a* and b*, the equation of $H=\arctan(b^*/a^*)*180/\pi$ is calculated. The calculation result thereof is set as HG.

The hue values HC, HM, and HY indicate respectively hue values of the primary colors of cyan, magenta, and yellow printed by the printer 4. The hue values HC, HM, and HY are obtained in a manner described below.

The printer 4 is supplied with (255, 0, 0, 0) as a CMYK control signal. The color printed by the printer 4 is then measured by a calorimeter to attain a calorimetric value (L*, a*, b*) Based on the values a* and b*, the equation of H=arctan (b*/a*)*180/π is calculated. The calculation result thereof is set as HC.

The printer 4 is supplied with (0, 255, 0, 0) as a CMYK control signal. The color printed by the printer 4 is then measured by a calorimeter to attain a calorimetric value (L*, a*, b*). Based on the values a* and b*, the equation of H=arctan (b*/a*)*180/π is calculated. The calculation result thereof is set as HM.

The printer 4 is supplied with (0, 0, 255, 0) as a CMYK control signal. The color printed by the printer 4 is then measured by a calorimeter to attain a calorimetric value (L*, a*, b*). Based on the values a* and b*, the equation of H=arctan (b*/a*)*180/π is calculated. The calculation result thereof is set as HY.

These hue values HR, HG, HC, HM, and HY satisfy the relationship of HR<HY<HG<HC<HM.

The hue storage region 18 is capable of further storing a hue value HB of the primary color of blue, which is desirable for a user. The user manipulates the keyboard 6 to input data of the hue value HB into the hue storage region 18. It is noted that the hue value HB has to satisfy the relationship of HR<HY<HG<HC<HB<HM with other hue values. Accordingly, if the user inputs the value of HB that fails to satisfy this relationship, this value HB is inhibited from being stored into the hue storage region 18.

The threshold value storage region 22 stores a predetermined threshold value T (a fixed value of 20 in this example).

Figure 3:
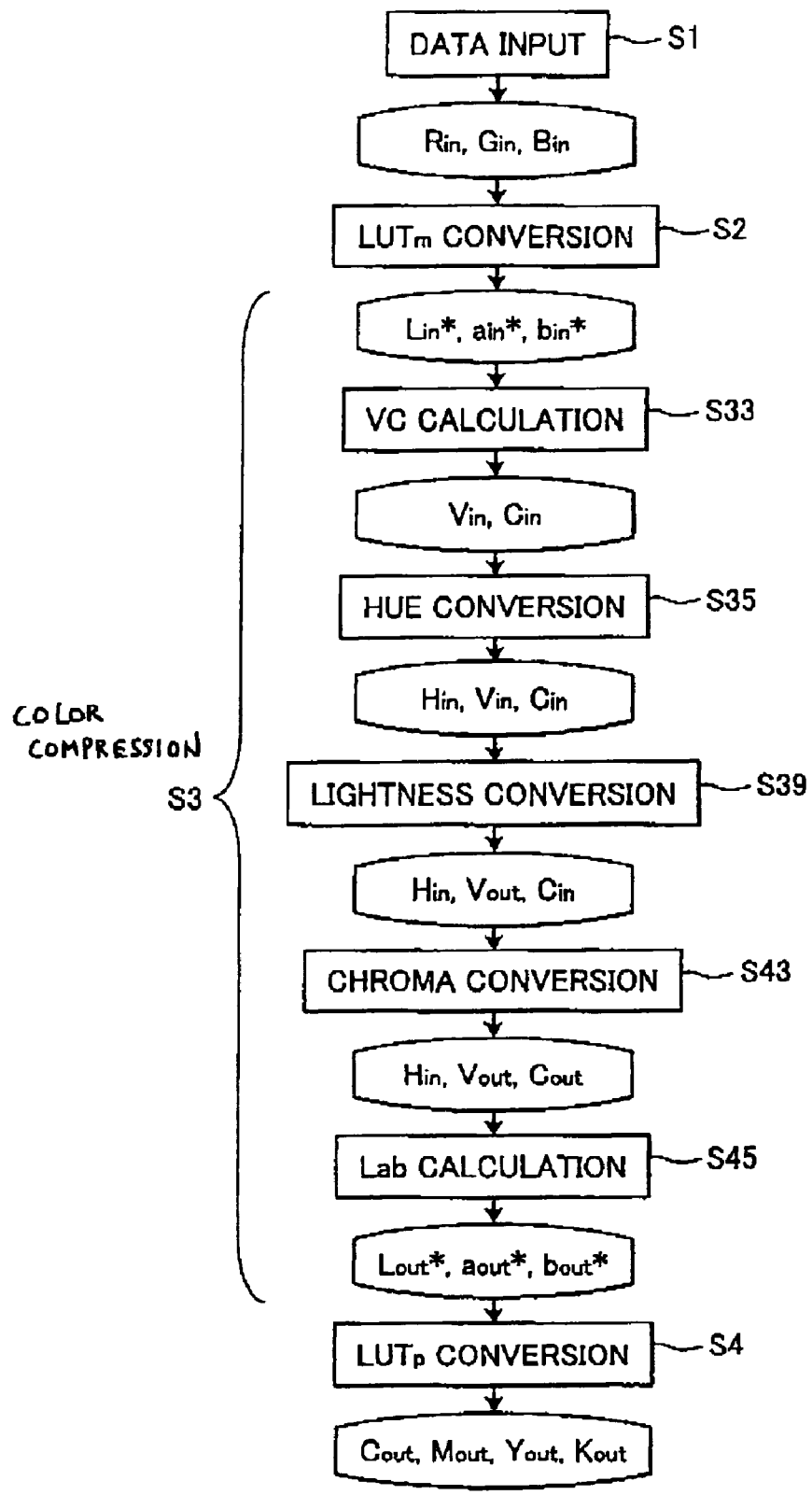
FIG. 3 is a explanatory view showing a procedure of a color conversion process according to the embodiment executed by the image forming system of FIG-2.

It is noted that data of the color compression program of FIG. 3, the color hue values HR, HG, HC, HM, and HY, the color gamuts Sm and Sp, and the threshold value T is first stored in a computer-readable storage medium (not shown), such as a flexible disk and the like, and then is downloaded into the storage regions 16, 18, 20, and 22. Or otherwise, the data may be downloaded into the storage regions 16, 18, 20, and 22 from a network (not shown).

The CPU 5 executes various programs such as the basic program, the application software, and the color compression program. The user of the image forming system 1 operates the keyboard 6 to input various data and commands to the image forming system 1.

Although not shown in the figures, the image forming system 1 further includes a modem to communicate with external devices, a mouse to control icons displayed on the monitor 3, and the like.

With reference to FIG. 3, a description will now be made of a procedure in which the CPU 5 executes the color compression program to convert RGB data (R, G, B) for controlling the monitor 3 into CMYK data (C, M, Y, K) for controlling the printer 4.

At first, in S1, the CPU 5 receives, from the image data storage region 12, a set of monitor control RGB data (Rin, Gin, Bin) for one pixel of an image displayed on the monitor 3.

Next in S2, the CPU 5 utilizes the look-up table LUTm to convert the RGB data set (Rin, Gin, Bin) into a set of Lab data (Lin*, ain*, and bin*) defined by the L*a*b* color system. The Lab data (Lin*, ain*, bin*) exists within the color gamut Sm of the monitor 3. It is noted that on the L* axis, the minimum value is 0 and the maximum value is 100.

Next in S3, the CPU 5 performs color-compression to convert the Lab data set (Lin*, ain*, bin*) into a set of Lab data (Lout*, aout*, bout*). The Lab data set (Lout*, aout*, bout*) exists within the color gamut Sp of the printer 4.

Next in S4, the CPU 5 uses the look-up table LUTp to convert the Lab data (Lout*, aout*, bout*) into a set of CMYK data (Cout, Mout, Yout, Kout) for controlling the printer 4.

Color compression processing in S3 will now be described in greater detail.

First, in S33, the CPU 5 determines a lightness value Vin and a chroma value Cin for the Lab data (Lin*, ain*, bin*), which is obtained in S2 and which indicates coordinates of the input data in the L*a*b* color space, by calculating the following expressions (1):

$$Cin = (ain^{*2} + bin^{*2})^{(1/2)}$$

$$Vin = L^* \tag{1}$$

It is also noted that on the V axis, the minimum value is 0 and the maximum value is 100.

Next in S35, the CPU 5 determines a hue value Hin of the RGB data (Rin, Gin, Bin) based on the RGB data (Rin, Gin, Bin) received in S1.

Next in S39, the CPU 5 converts the lightness value Vin obtained in S33 into a corrected lightness value Vout, based on the hue value Hin obtained in S35.

Next in S43, the CPU 5 converts the chroma value Cin obtained in S33 into a corrected chroma value Cout, based on the hue value Hin obtained in S35.

Next in S45, the CPU 5 converts the values Hin, Vout, and Cout respectively obtained in S35, S39, and S43 into Lab data (Lout*, aout*, bout*) defined by the L*a*b* color system, by means of the following expressions (2):

$$Lout^* = Vout,$$

$$aout^* = Cout^* \cos((Hin/180)^*\pi),$$

$$bout^* = Cout^* \sin((Hin/180)^*\pi) \tag{2}$$

Hue calculation processing in S35 will now be described in greater detail with reference to FIGS. 4 and 5.

During the hue calculation processing according to the present embodiment, the CPU 5 calculates either one of the following six functions f1 (Rin, Gin, Bin), f2 (Rin, Gin, Bin), f3 (Rin, Gin, Bin), f4 (Rin, Gin, Bin), f5 (Rin, Gin, Bin), and f6 (Rin, Gin, Bin), dependently on the relationship between the values Rin, Gin, and Bin and based on the RGB data (Rin, Gin, Bin) received in S1:

Where Rin≧Gin≧Bin, H=f1(Rin, Gin, Bin)=HR+(HY−HR)*k

Where Gin≧Rin≧Bin, H=f2(Rin, Gin, Bin)=HG−(HG−HY)*k

Where Gin≧Bin≧=Rin, H=f3(Rin, Gin, Bin)=HG+(HC−HG)*k

Where Bin≧Gin≧Rin, H=f4(Rin, Gin, Bin)=HB−(HB−HC)*k

Where Bin≧Rin≧Gin, H=f5(Rin, Gin, Bin)=HB+(HM−HB)*k

Where Rin≧Bin≧Gin, H=f6(Rin, Gin, Bin)=HR−(HR+360−HM)*k

In these functions, k=(M−S)/(L−S) is given, wherein L, M, and S are respectively the maximum color gradation value, middle color gradation value, and minimum color gradation value, among Rin, Gin, and Bin of the input color image data (Rin, Gin, Bin).

Figure 4:
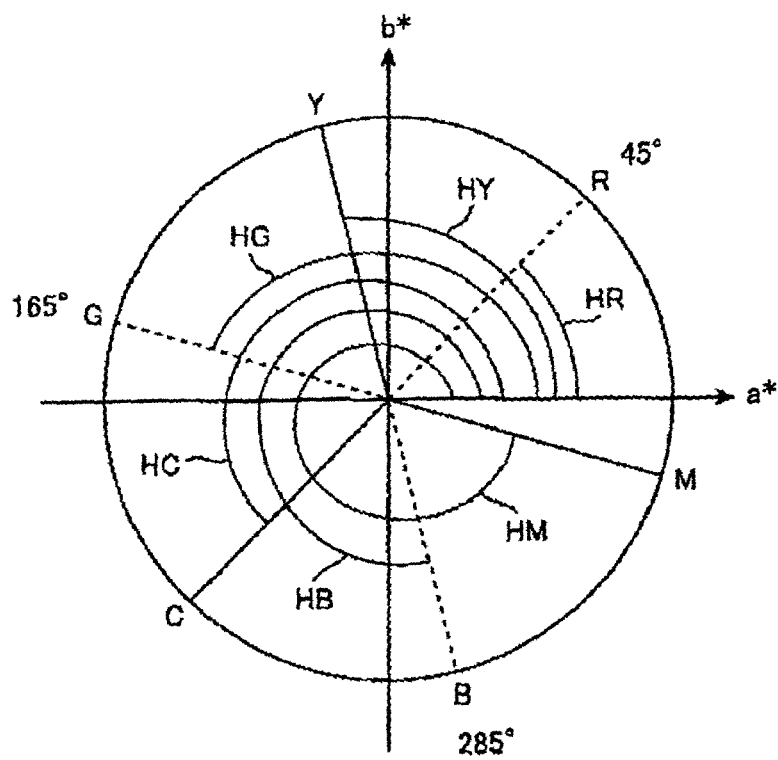
FIG. 4 is an explanatory view showing hue angles HR, HY, HG, HC, HB, and HM of primary colors R, Y, G, C, B, and M used in a hue conversion step in the color compression processing in FIG. 3.
Figure 5:
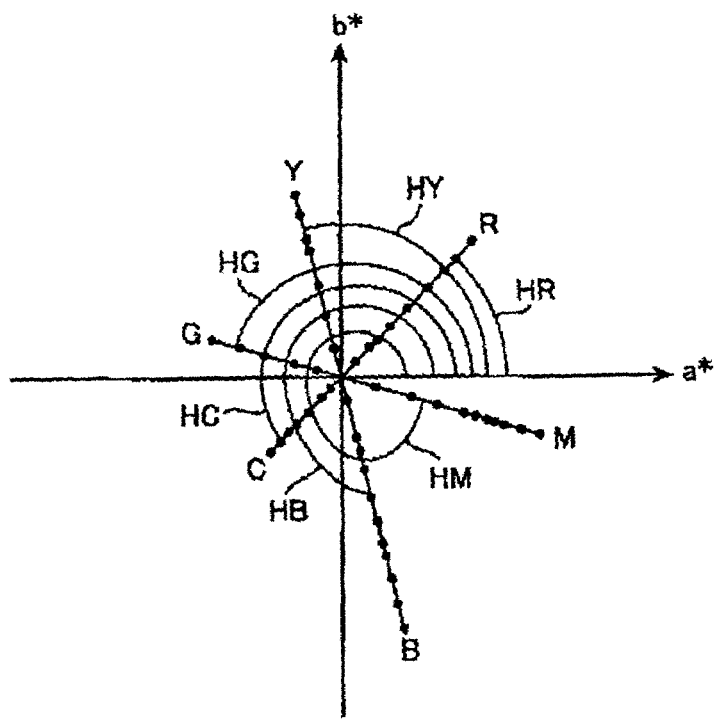
FIG. 5 is an explanatory view showing how gradations of CMYRGB primary colors are obtained after the hue conversion step of FIG. 3.

For example, the hue values HR, HY, HG, HC, HB, and HM stored in the hue storage region 18 have values as shown in FIG. 4 and satisfy the relationship of HR<HY<HG<HC<HB<HM.

In this way, the CPU 5 calculates H=f1(Rin, Gin, Bin) when Rin≧Gin≧Bin, calculates H=f2(Rin, Gin, Bin) when Gin≧Rin≧Bin, calculates H=f3(Rin, Gin, Bin) when Gin≧Bin≧Rin, calculates H=f4(Rin, Gin, Bin) when Bin≧Gin≧Rin, calculates H=f5(Rin, Gin, Bin) when Bin≧Rin≧Gin, and calculates H=f6(Rin, Gin, Bin) when Rin≧Bin≧Gin.

When the result of calculation H=fi (R, G, B) (where i is either one of values 1 to 6) is equal to or greater than 0 and is smaller than 360, this value H is set as the hue value Hin. Alternatively, when the calculated result H is negative, 360 is added to this result, and the result of the addition is set as the hue value Hin. Alternatively, when the calculated result H is 360 or greater, 360 is subtracted from the result H, and the result is set as the hue value Hin. The CPU 5 can thus calculate, as the hue angle Hin, a value which is equal to or greater than 0 and is smaller than 360.

Thus, according to the present embodiment, the CPU 5 determines the hue value Hin directly from the RGB data (Rin, Gin, Bin). The CPU 5 does not calculate an equation Hin=arctan (bin*/ain*)*180/π, based on ain* and bin* obtained in S2, to determine the hue angle Hin.

In addition, one of the foregoing functions f1 (Rin, Gin, Bin) to f6 (Rin, Gin, Bin) is selected depending on the relationship in size among the values Rin, Gin, and Bin. The functions f1 (Rin, Gin, Bin) to f6 (Rin, Gin, Bin) use the hue values HR and HG of the red and green primary colors of the monitor 3, the hue values HC, HM, and HY of the cyan, magenta, and yellow primary colors of the printer 4, and the hue value HB of the blue primary color which is designated by the user.

Therefore, in S35, a hue value the same as the hue value HR is obtained for each of all the 511 sets of RGB data (Rin, Gin, Bin) that are arranged on the red gradation from black to white and that are inputtable in S1. In this data group of the red gradation, only the value R increases sequentially from 0 to 255 to attain (0, 0, 0) to (255, 0, 0), and then, the values G and B increase sequentially from 1 to 255 while being kept equal to each other to attain (255, 1, 1) to (255, 255, 255). The 511 RGB data sets (R, G, B) therefore include; (0, 0, 0) (black), (1, 0, 0), . . . (254, 0, 0), (255, 0, 0) (red full color), (255, 1, 1,) . . . , (255, 254, 254), and (255, 255, 255) (white). In this data group, M=S, and therefore k=0 is satisfied. Accordingly, H=HR is always obtained by calculating the function f1 (Rin, Gin, Sin) that corresponds to Rin≧Gin≧Bin or f6 (Rin, Gin, Bin) that corresponds to Rin≧Bin≧Gin. Accordingly, as shown in the ab plane in the Lab space of FIG. 5, colors of all the RGB data on the red gradation are positioned on a linear equal-hue line which extends from the origin (0, 0, 0) (black) through the red full color (255, 0, 0) and returns to the origin (255, 255, 255) (white) again, and which is shifted from the a* axis with the fixed amount of hue angle HR.

Similarly, in S35, a hue value the same as the hue value HG is obtained for each of all the 511 sets of RGB data (Rin, Gin, Bin) that are arranged on the green gradation from black to white and that are inputtable in S1. In this data group of the green gradation, only the value G is increases sequentially from 0 to 255 to attain (0, 0, 0) to (0, 255, 0), and then, the values R and B increase sequentially from 1 to 255 while being kept equal to each other to attain (1, 255, 1) to (255, 255, 255). The 511 RGB data sets (R, G, B) therefore include: (0, 0, 0) (black), (0, 1, 0), . . . (0, 254, 0), (0, 255, 0) (green full color), (1, 255, 1)., (254, 255, 254), and (255, 255, 255) (white). In this data group, M=S, and therefore k=0 is satisfied. Accordingly, H=HG is always obtained by calculating the function f2 (Rin, Gin, Bin) that corresponds to Gin≧Rin≧Bin or f3 (Rin, Gin, Bin) that corresponds to Gin≧Bin≧Rin. Accordingly, as shown in the ab plane in the Lab space of FIG. 5, colors of all the RGB data on the green gradation are positioned on a linear equal-hue line which extends from the origin (0, 0, 0) (black) through the green full color (0, 255, 0) and returns to the origin (255, 255, 255) (white) again, and which is shifted from the a* axis with the fixed amount of hue angle HG.

Similarly, in S35, a hue value the same as the hue value HB is obtained for each of all the 511 sets of RGB data (Rin, Gin, Bin) that are arranged on the blue gradation from black to white and that are inputtable in S1. In this data group of the blue gradation, only the value B increases sequentially from 0 to 255 to attain (0, 0, 0) to (0, 0, 255), and then, the values R and G increase sequentially from 1 to 255 while being kept equal to each other to attain (1, 1, 255) to (255, 255, 255). The 511 RGB data sets (R, G, B) therefore include: (0, 0, 0) (black), (0, 0, 1), . . . (0, 0, 254), (0, 0, 255) (blue full color), (1, 1, 255) . . . , (254, 254, 255), and (255, 255, 255) (white). In this data group, M=S. and therefore k=0 is satisfied. Accordingly, H=HB is always obtained by calculating the function f4 (Rin, Gin, Bin) that corresponds to Bin≧Gin≧Rin or f5 (Rin, Gin, Bin) that corresponds to Bin≧Rin≧Gin. Accordingly, as shown in the ab plane in the Lab space of FIG. 5, colors of all the RGB data on the blue gradation are positioned on a linear equal-hue line which extends from the origin (0, 0, 0) (black) through the blue full color (0, 0, 255) and returns to the origin (255, 255, 255) (white) again, and which is shifted from the a* axis with the fixed amount of hue angle HB.

Similarly, in S35, a hue value the same as the hue value HC is obtained for each of all the 511 sets of RGB data (Rin, Gin, Bin) that are arranged on the cyan gradation from black to white and that are inputtable in S1. In this O data group of the cyan gradation, the values G and B increase sequentially from 0 to 255 while being kept equal to each other to attain (0, 0, 0) to (0, 255, 255), and then, the value R increases sequentially from 1 to 255 to attain (1, 255, 255) to (255, 255, 255). The 511 RGB data sets (R, G, B) therefore include: (0, 0, 0) (black), (0, 1, 1), . . . (0, 254, 254), (0, 255, 255) (cyan full color), (1, 255, 255) . . . , (254, 255, 255), and (255, 255, 255) (white). In this data group, L=M, and therefore k=1 is satisfied. Accordingly, H=HC is always obtained by calculating the function f3 (Rin, Gin, Bin) that corresponds to Gin≧Bin≧Rin or f4 (Rin, Gin, Bin) that corresponds to Bin≧Gin≧Rin. Accordingly, as shown in the ab plane in the Lab space of FIG. 5, colors of all the RGB data on the cyan gradation are positioned on a linear equal-hue line which extends from the origin (0, 0, 0) (black) through the cyan full color (0, 255, 255) and returns to the origin (255, 255, 255) (white) again, and which is shifted from the a* axis with the fixed amount of hue angle HC.

Similarly, in S35, a hue value the same as the hue s value HM is obtained for each of all the 511 sets of RGB data (Rin, Gin, Bin) that are arranged on the magenta gradation from black to white and that are inputtable in S1. In this data group of the magenta gradation, the values R and B increase sequentially from 0 to 255 while being kept equal to each other to attain (0, 0, 0) to (255, 0, 255), and then, the value G increases sequentially from 1 to 255 to attain (255, 1, 255) to (255, 255, 255) The 511 RGB data sets (R, G, B) therefore include: (0, 0, 0) (black), (1, 0, 1), . . . (254, 0, 254), (255, 0, 255) (magenta full color), (255, 1, 255) . . . , (255, 254, 255), and (255, 255, 255) (white). In this data group, L=M, and therefore k=1 is satisfied. Accordingly, H=HM or HM−360 is always obtained by calculating the function f5 (Rin, Gin, Bin) that corresponds to Bin≧Rin≧Gin or f6 (Rin, Gin, Bin) that corresponds to Rin≧Bin≧Gin. Accordingly, as shown in the ab plane in the Lab space of FIG. 5, colors of all the RGB data on the magenta gradation are positioned on a linear equal-hue line which extends from the origin (0, 0, 0) (black) through the magenta full color (255, 0, 255) and returns to the origin (255, 255, 255) (white) again, and which is shifted from the a* axis with the fixed amount of hue angle HM.

Similarly, in S35, a hue value the same as the hue value HY is obtained for each of all the 511 sets of RGB data (Rin, Gin, Bin) that are arranged on the yellow gradation from black to white and that are inputtable in S1. In this data group of the yellow gradation, the values R and G increase sequentially from 0 to 255 while being kept equal to each other to attain (0, 0, 0) to (255, 255, 0), and then, the value B increases sequentially from 1 to 255 to attain (255, 255, 1) to (255, 255, 255). The 511 ROB data sets (R, G, B) therefore include: (0, 0, 0) (black), (1, 1, 0), . (254, 254, 0), (255, 255, 0) (yellow full color), (255, 255, 1) . . . , (255, 255, 254), and (255, 255, 255) (white). In this data group, L=M, and therefore k=1 is satisfied. Accordingly, H=HY is always obtained by calculating the function f1 (Rin, Gin, Bin) that corresponds to Rin≧Gin≧Bin or f2 (Rin, Gin, Bin) that corresponds to Gin≧Rin≧Bin. Accordingly, as shown in the ab plane in the Lab space of FIG. 5, colors of all the RGB data on the yellow gradation are positioned on a linear equal-hue line which extends from the origin (0, 0, 0) (black) through the yellow full color (255, 255, 0) and returns to the origin (255, 255, 255) (white) again, and which is shifted from the a* axis with the fixed amount of hue angle HY.

In this way, data on the gradation of each primary color is positioned on a linear equal-hue line which extends from the origin (0, 0, 0) (black) through a corresponding full color and returns again to the origin (255, 255, 255) (white). Contrary to the case in FIG. 1(*a*), proper linear gradation is attained according to the present embodiment.

The values HR and HG are set as hue values of primary colors of the monitor 3. Therefore, the primary colors R and G of the monitor 3 can be reproduced properly.

Further, the values HC, HM, and HY are set as hue values of the primary colors of the printer 4. Therefore, the primary colors C, M, and Y of the monitor 3 can be reproduced by the primary colors C, M, and Y of the printer 4.

With respect to the color B, the user can set the hue angle HB so that the primary color B having proper gradation can be obtained with the user's desired hue. In general, the color of blue is difficult to reproduce. However, by the user appropriately setting the hue value of blue, the hue of blue can be reproduced to match with the user's desired state.

Next, lightness conversion processing in S39 will be described in greater detail with reference to FIGS. 6(*a*) to 9.

In this processing, at first, the CPU 5 reads the threshold value T (e.g., a fixed value of 20 in this case) from the threshold value storage region 22.

The CPU 5 next reads, from the color gamut storage region 20, data of the maximum lightness value Vmax and the minimum lightness value Vmin in the color gamut Sm, the maximum chroma values Cmax corresponding to all the lightness values V at the hue value Hin in the color gamut Sm, and the full color lightness value V0 at the hue value Hin in the color gamut Sm. The CPU 5 further reads, from the color gamut storage region 20, data of the maximum lightness value Vmax and the minimum lightness value Vmin in the color gamut Sp, the maximum chroma values CT corresponding to all the lightness values V at the hue value Hin in the color gamut Sp, and the full color lightness value V02 at the hue value Hin in the color gamut Sp.

It is noted that this example is related to the case where the maximum lightness value Vmax in the color gamut Sm is equal to the maximum lightness value Vmax in the color gamut Sp and where the minimum lightness value Vmin in the color gamut Sm is equal to the minimum lightness value Vmin in the color gamut Sp.

Figure 6A:
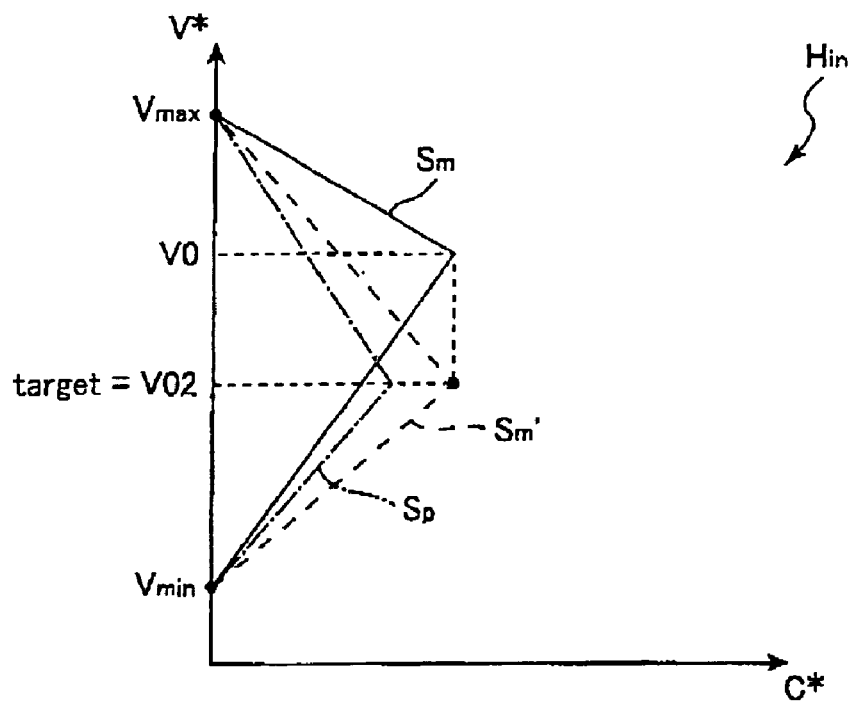
Figure 6B:
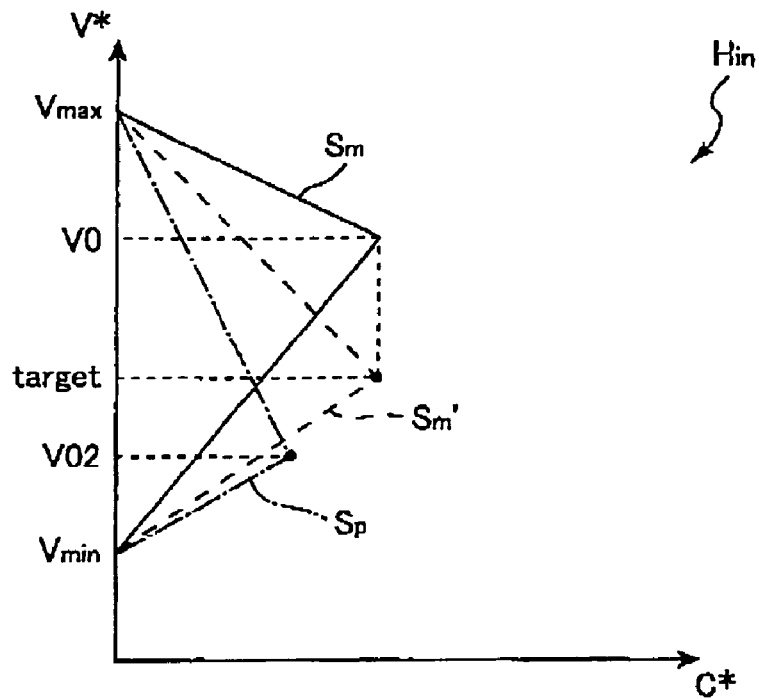

Each of FIGS. 6(*a*) and 6(*b*) shows a lightness-chroma plane (equal-hue plane) at the hue Hin. In the lightness-chroma plane of the hue Hin, the color gamut Sm has the maximum chroma in correspondence with the full color lightness value V0. In the lightness-chroma plane of the hue Hin, the color gamut Sp has the maximum chroma in correspondence with the full color lightness value V02, It is noted that FIG. 6(*a*) is related to the case where the s difference between the lightness values V0 and V02 is smaller than or equal to the threshold value T (=20). On the other side, FIG. 6(*b*) is related to the case where the difference between the lightness values V0 and V02 is greater than the threshold value T (=20).

Next, the CPU 5 calculates the following expression (3) or (4) to set a target lightness value "target":

Where $Abs(V0-V02)>T$, target=$K*(V0-V02)+V02$ (3)

Where $Abs(V0-V02) \leq T$, target=$V02$ (4)

In these expressions, Abs( ) is a function to obtain the absolute value of the value in ( ), and K is a coefficient which satisfies $0 \leq K \leq 1$. In this example, K=⅓ is given.

Therefore, if the difference between V0 and V02 is smaller than or equal to T as shown in FIG. 6(*a*), the target lightness value "target" is set to a value equal to V02. As a result, a corrected color gamut Sm' is determined as shown in the figure. The full color lightness value of the corrected color gamut Sm' is equal to the target lightness value "tartget" (=V02), and the maximum lightness value Vmax and the minimum lightness value Vmin of the corrected color gamut Sm' are equal to the maximum lightness value Vmax and the minimum lightness value Vmin of the original color gamut Sm, respectively.

On the other side, if the difference between V0 and V02 is greater than T as shown in FIG. 6(*b*), the target lightness value "target" is adjusted in the direction from V02 toward V0. That is, the target lightness value "target" is set to a value between V02 and V0. In addition, the difference between the target lightness value "target" and V02 is K (⅓ in this example) times the difference between V02 and V0, and thus depends on the difference between V02 and V0 As a result, the corrected color gamut Sm' is determined as shown in the figure. The full color lightness value of the corrected color gamut Sm' is equal to the target lightness value "tartget" (=$K*(V0-V02)+V02$), and the maximum lightness value Vmax and the minimum lightness value Vmin of the corrected color gamut Sm' are equal to the maximum lightness value Vmax and the minimum lightness value Vmin of the original color gamut Sm, respectively.

Figure 7:
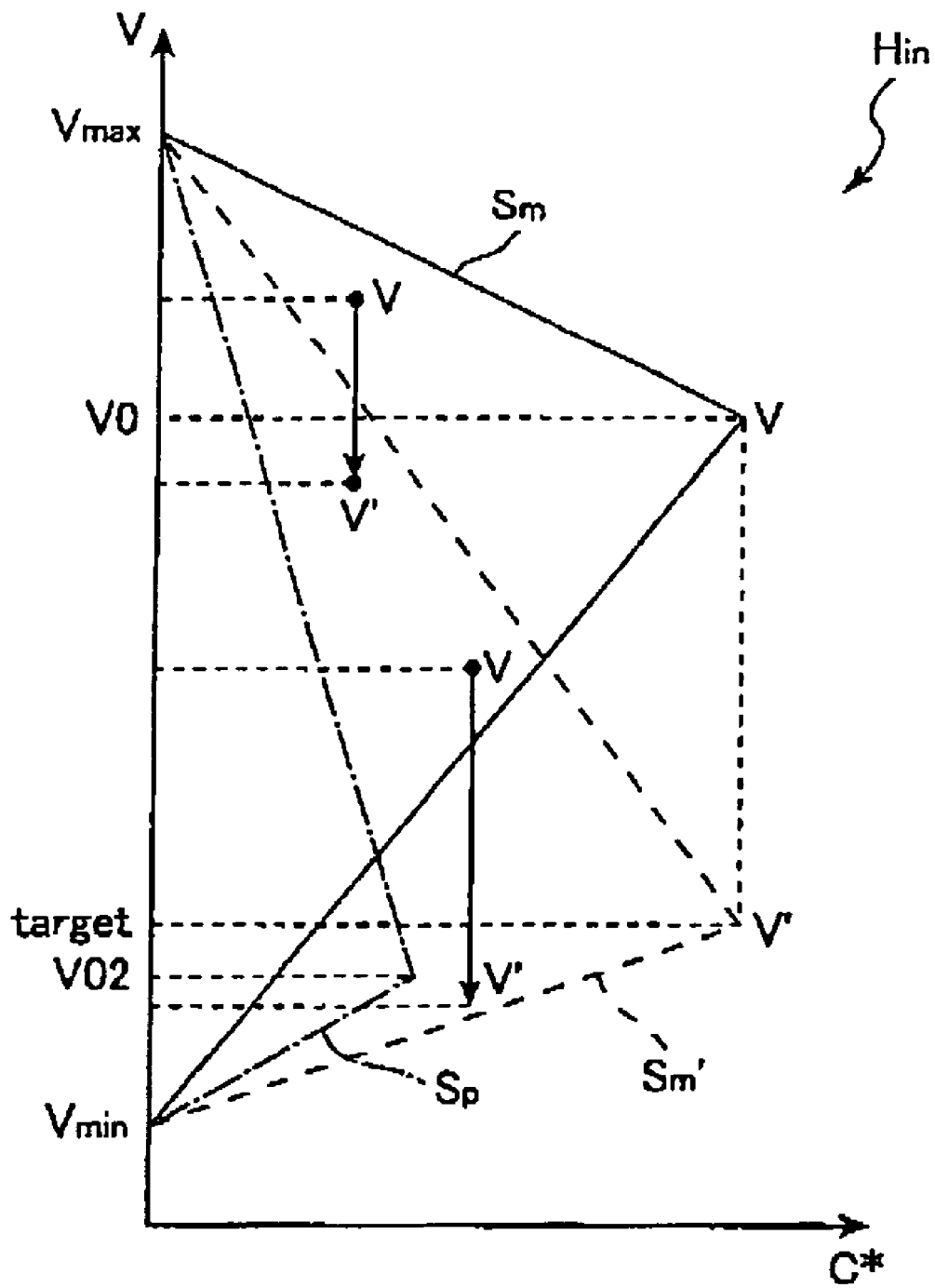
FIG. 7 is an explanatory view showing how to convert lightness in a lightness-chroma plane.

The lightness value V in the color gamut Sm and the lightness value V' in the color gamut Sm' have the relationship as shown in FIG. 7, which is defined by the following expressions (5) and (6):

Where $V \leq V0$, $V' = Vmin + (V - Vmin) \cdot (target - Vmin)/(V0 - Vmin)$ (5), Where $V > V0$, $V' = target + (V - V0) \cdot (Vmax - target)/(Vmax - V0)$ (6)

wherein the values Vmin and Vmax are the minimum lightness and the maximum lightness of the color gamut Sm at the hue Hin.

It is also noted that in FIG. 7, the difference between V0 and V02 is greater than the threshold T, and therefore the target lightness "target" has a value between V0 and V02.

As is apparent from this relationship, the target lightness value "target" that is the lightness value of the full color in the color gamut Sm' corresponds to the lightness value V0 of the full color in the color gamut Sm.

Accordingly, with respect to each lightness value V between Vmin and Vmax, the CPU 5 calculates the above expression (5) or (6) to obtain a corresponding lightness value V'. The CPU 5 sets the maximum chroma value Cmax' of the monitor 3 with respect to every lightness value V', to be equal to the maximum chroma value Cmax of the monitor 3 with respect to the corresponding original lightness value V in the color gamut Sm. The value Cmax' corresponding to every lightness value V' is added as data of the corrected color gamut Sm' to the color gamut storage region 20.

The CPU 5 further calculates the above expression (5) or (6) with respect to the lightness value Vin obtained in S33, to determine the lightness value Vin' in the color gamut Sm', which corresponds to the lightness value Vin in the color gamut Sm. More specifically, the CPU 5 calculates the following expressions:

If Vin≦V0, $$Vin'=Vmin+(Vin-Vmin)\cdot(target-Vmin)/(V0-Vmin)$$

If Vin>V0, $$Vin'=target+(Vin-V0)\cdot(Vmax-target)/(Vmax-V0)$$

Further, the CPU 5 reads $Cmax_{(Vin)}$ (the maximum chroma value which the color gamut Sm has with respect to the lightness value Vin at the hue value Hin) from the color gamut storage region 20.

The CPU 5 uses the lightness value Vin', $Cmax_{(Vin)}$, and the chroma value Cin obtained in S33, to calculate the following expression (7), thereby correcting the lightness value Vin into a corrected lightness value Vout:

$$Vout=Vin+(Vin'-Vin)\times F(X) \qquad (7)$$

wherein $X=(Cin)/(Cmax_{(Vin)})$, and F(X) is a function with respect to X. F(X) satisfies the condition of $0 \leq F(X) \leq 1$ with respect to X that satisfies $0 \leq X \leq 1$. F(X) is a monotone increasing function which increases from 0 to 1 as X increases from 0 to 1.

Figure 8:
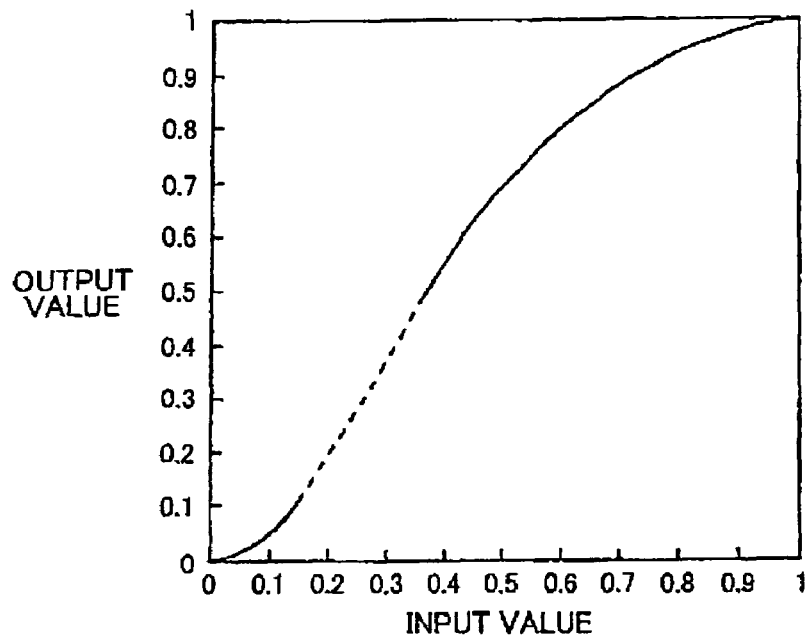
FIG. 8 is a graph showing an example of a sigmoid function used in lightness conversion.

In the present embodiment, a sigmoid function as shown in FIG. 8 is used as F(X). The sigmoid function is given by the following expressions.

Where $X \geq a$, $Y=F(X)=a^{(1-\gamma)}*X^\gamma$

Where $X<a$, $Y=F(X)=1-(1-a)^{(1-\gamma)}*(1-X)^\gamma$

In these expressions, a and γ are parameters which can be arbitrarily inputted by the user through the keyboard 6. The value "a" indicates the value of X, at which the sigmoid function has a differential coefficient of 1, and the value γ indicates the extent of the upward convex of the sigmoid function. The sigmoid function shown in FIG. 8 gives a=0.2 and γ=2.

Figure 9:
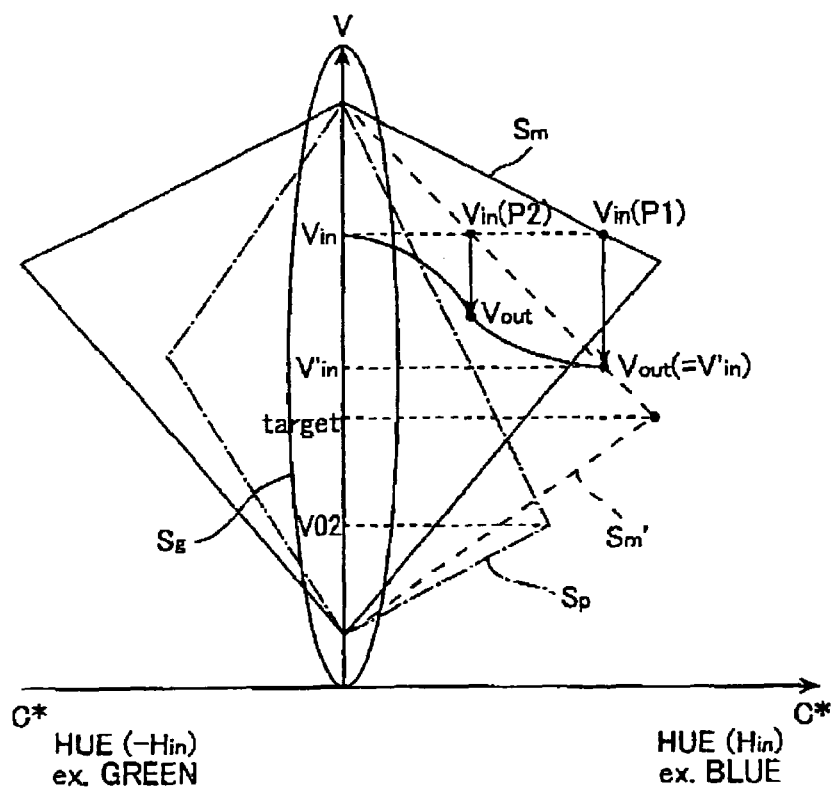
FIG. 9 shows color gamuts on lightness-chroma planes at two hues which are arranged on opposite sides with respect to the lightness axis, and shows how to convert lightness.

It is now assumed that as shown in FIG. 9, the value combination (Vin, Cin), which is obtained in S33 with respect to input data (Rin, Gin, Bin) and which is indicated by point P1 in the figure, has the value Cin that is equal to the maximum chroma value $Cmax_{(Vin)}$ for the value Vin. In this case, according to the lightness-compression of equation (7), Vin is shifted by the amount of (Vin−Vin') and is converted into Vout (=Vin').

Assume alternatively that as indicated by point P2 in the figure, the value combination (Vin, Cin) has the value Cin that is equal to substantially a half of the value $Cmax_{(Vin)}$ for the value Vin. In this case, according to the lightness-compression of equation (7), Vin is shifted by an amount which is only F(0.5) times (Vin−Vin'), that is, about 0.7 times (Vin−Vin'). Accordingly, Vin is converted into Vout≈(Vin+(Vin'−Vin)× 0.7). In this way, when Cin is smaller than $Cmax_{(Vin)}$, Vin is corrected by an amount smaller than the amount of (Vin− Vin').

Therefore, the difference between the lightness value Vin and the corrected lightness value Vout decreases as the chroma value Cin decreases, as shown in FIG. 9. As a result, the gradation characteristics in the region Sg that has a relatively small chroma value Cin and therefore that is gray can be maintained.

It is noted that F(x) need not always be a sigmoid function as far as $0 \leq F(X) \leq 1$ is satisfied with respect to X of $0 \leq x \leq 1$, and as long as F(X) is a monotone increasing function which increases from 0 to 1 as X increases from 0 to 1.

Next in S43, the CPU 5 compresses the chroma value Cin of (Vin, Cin) obtained in S33, into the corrected chroma value Cout.

More specifically, in S43, the CPU 5 firstly reads, from the color gamut storage region 20, the value of the maximum chroma value $Cmax'_{(Vout)}$ which the corrected color gamut Sm' has with respect to the lightness value Vout at the hue value Hin. The CPU 5 also reads, from the color gamut storage region 20, the maximum chroma value $CT_{(Vout)}$ which the color gamut Sp has with respect to the lightness value Vout, at the hue value Hin.

Next, the CPU 5 calculates the following expression (8) to convert the chroma value Cin into a corrected chroma value Cout:

$$Cout=Cin-(Cmax'_{(Vout)}-CT_{(Vout)})\times Cin/Cmax'(Vout) \qquad (8)$$

Figure 10:
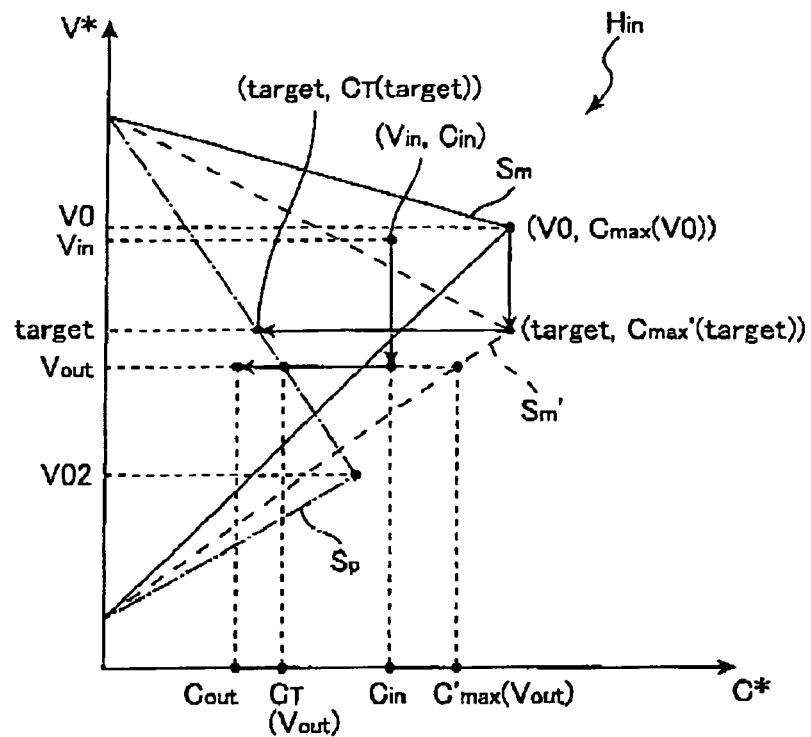
FIG. 10 is an explanatory view showing how to compress chroma after compressing lightness on a lightness-chroma plane during the color compression processing in FIG. 3.

It is now assumed that as shown in FIG. 10, (Vin, Cin) is obtained in S33, and Vin is compressed to Vout in the lightness direction in S39. Thereafter, in S43, Cin is compressed in the chroma direction and converted into a corrected chroma value Cout. Thus, (Vin, Cin) in the color gamut Sm is converted into (Vout, Cout) in the color gamut Sp through (Vout, Cin) in the color gamut Sm'.

If (Vin, Cin) obtained in S33 is a full color (V0, $Cmax_{(V0)}$) in the color gamut Sm, Vin is compressed to Vout (=Vin'=target) in the lightness direction in S39. Thus, the full color in the color gamut Sm is converted into a full color in the corrected color gamut Sm'. Thereafter, in S43, Cin is compressed to a corrected chroma value $Cout=CT_{(target)}$ in the chroma direction. Thus, the full color (V0, $Cmax_{(V0)}$) in the color gamut Sm is converted into (target, $CT_{(target)}$) positioned at an edge of the color gamut Sp, through the full color (target, $Cmax'_{(target)}(=Cmax(V0))$) positioned in the corrected color gamut Sm'. It is noted that FIG. 10 is related to the case where the difference between the full color lightness value V0 in the color gamut Sm and the full color lightness value V02 in the color gamut Sp is greater than the threshold value T. Therefore, the full color lightness value "target" in the color gamut Sm' is different from the full color lightness value V02 in the color gamut Sp. In other words, the color (target, $CT_{(target)}$) is different from the full color in the color gamut Sp. In this way, the printer 4 does not reproduce the full color (V0, Cmax(V0)) of the monitor 3 by the full color (V02, CT(V02)) of the printer 4. The printer 4 reproduces the full color of the monitor 3 by the color (target, CT(target)) that has smaller chroma but that has higher lightness than the full color (V02, CT(V02)) of the printer 4. The user senses good color matching between the full color (V0, Cmax(V0)) on the monitor 3 and the non-full color (target, CT(target)) on the printer 4 that has a lightness lighter than the full color V02 of the printer 4.

Figure 11:
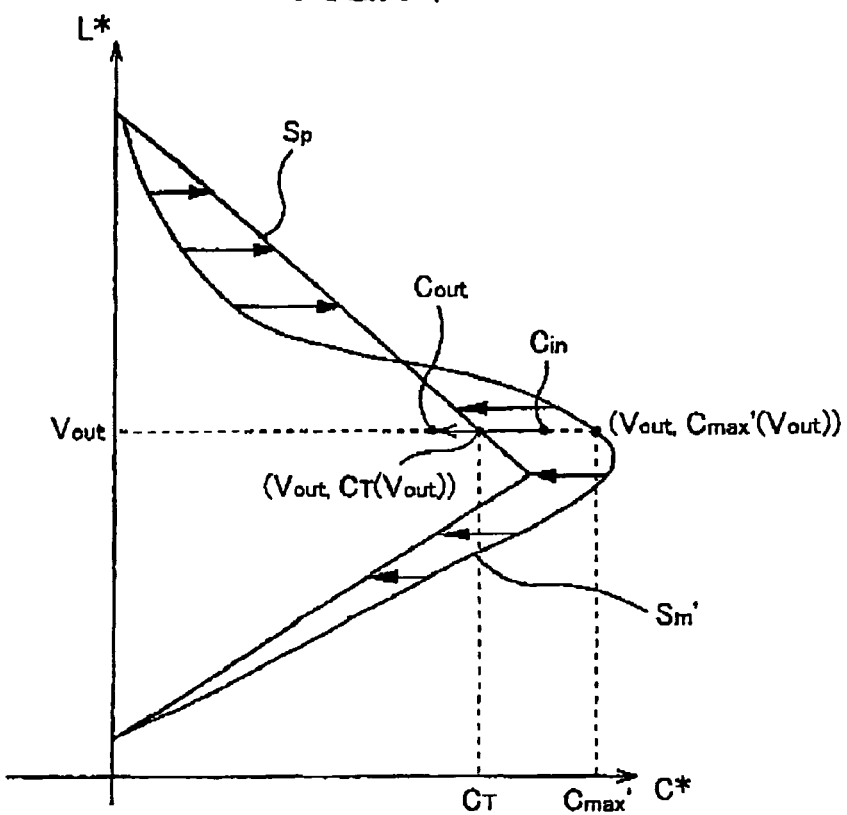
FIG. 11 is an explanatory view showing how to compress chroma on a lightness-chroma plane.

According to the above-described expression (8), all colors (Vout, Cin) in the color gamut Sm' are converted into colors (Vout, Cout) in the color gamut Sp, as shown in FIG. 11. All colors (Vout, Cmax' (Vout)) positioned on the edge of the color gamut Sm' are converted into points (Vout, $CT_{(Vout)}$) positioned on the edge of the color gamut Sp.

A target lightness value "target" was calculated with the use of the above-described expression (3) or (4) based on V0 and V02 of the monitor 3 and printer 4 for each of six primary colors of RYGCBM. Also for each of six primary colors of RYGCBM, a sensory evaluation test was carried out That is, the RYGCBM primary colors were printed by the printer 4, and the printed results were observed with eyes. An optimal lightness value was determined with respect to each primary color, and the value of the optimal lightness was set as a sensory optimal value.

Figure 12:
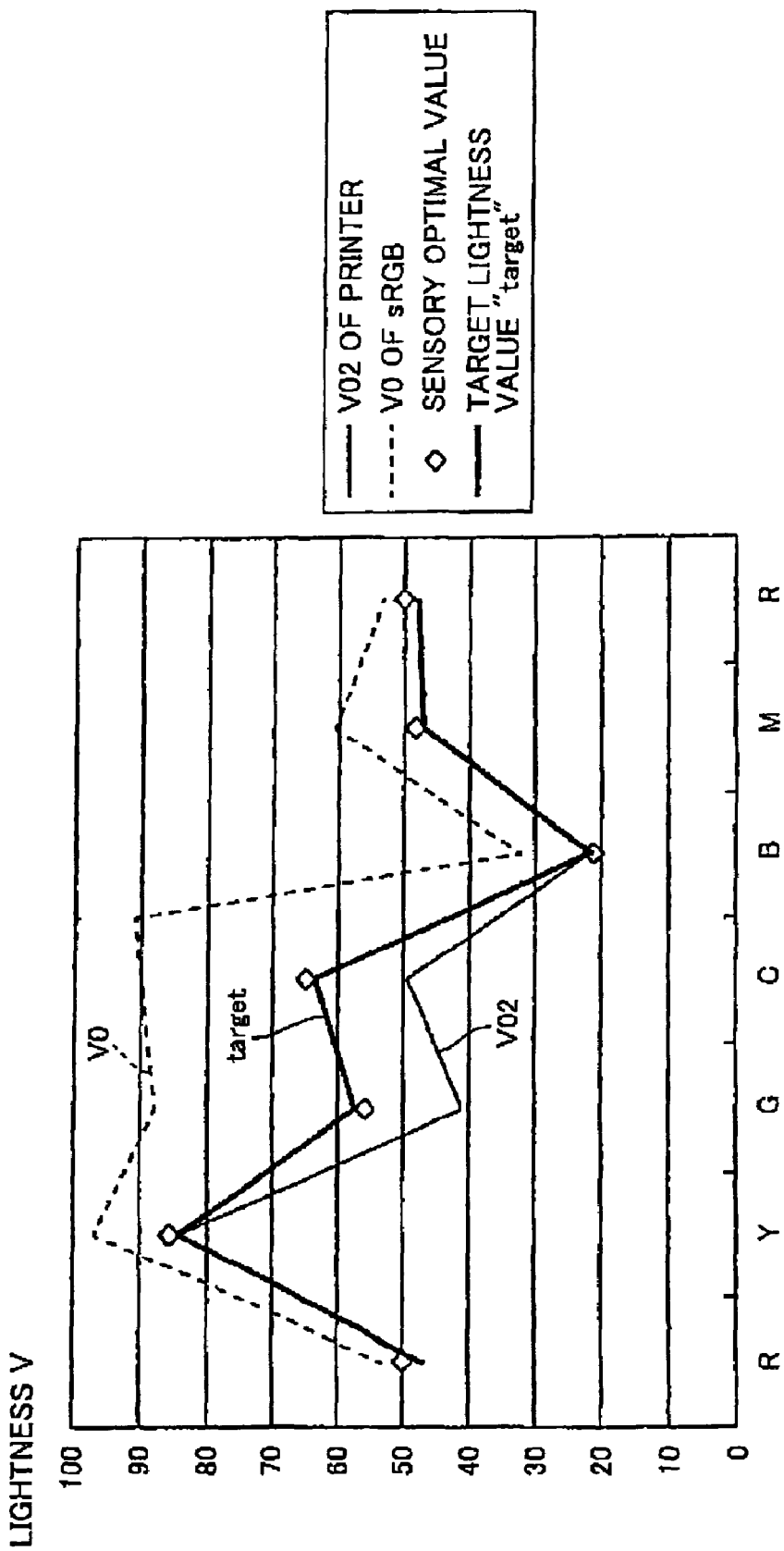
FIG. 12 is a graph showing a relationship among V02, V0, a target lightness "target", and a sensory optimal value at each hue of primary colors of RYGCBM.

FIG. 12 shows a relationship among V02, V0, a target lightness value "target", and a sensory optimal value, with respect to each primary color of RYGCBM. The narrow solid line indicates V02, and the broken line indicates V0. The thick solid line indicates the target lightness value "target", and the mark ◇ indicates the sensory optimal value.

It is confirmed from this figure that the optimal values in the sensory tests are approximated well by the target lightness values "target" obtained from the foregoing calculations (3) and (4). It is confirmed that the sensorily preferred colors can be reproduced easily by adjusting the lightness using the target lightness value "target".

To be more specific, the difference between V0 and V02 is smaller than or equal to the threshold value T (=20), with respect to the primary colors of RYBM. Therefore, the expression (4) is used and the target lightness value "target" is set to be equal to V02. This means that for RYBM the full color V0 of the monitor 3 is reproduced by the full color V02 of the printer 4. That is, the most vivid colors reproduced by the monitor 3 for RYBM are reproduced by the most vivid colors reproducible by the printer 4 for RYBM. Accordingly, by using the color gamut of the printer 4 widely, RYBM colors are reproduced vividly as desirable by the user.

On the other hand, the difference between V0 and V02 is greater than the threshold value T (=20), with respect to the primary colors of C (cyan) and G (green). Accordingly, the primary colors C and G are reproduced as relatively low bright colors by the printer 4. In contrast, these colors are reproduced as high bright colors on the monitor 3. If the target lightness value "target" were set to be equal to V02 of the printer 4, the most vivid colors reproduced by the monitor 3 for CG will be reproduced by the most vivid colors reproducible by the printer 4 for CG. The user will sense that coloring of the printer 4 does not match with the coloring of the monitor 3. On the contrary, according to the present embodiment, with respect to the colors C and G, the target lightness value "target" is set to a value between V0 and V02 with the use of the expression (3). Therefore/ for C and G the full colors of the monitor 3 are not reproduced by the full colors of the printer 4. The printer 4 reproduces the full colors of the monitor 3 for C and G by colors, whose chroma are smaller than the chroma of the full colors of the printer 4 but whose lightness are greater than the full colors of the printer 4. The user senses good matching between the CG colors of the monitor 3 and the CG colors of the printer 4.

As described above, according to the present embodiment, the hue Hin of the input color data (Rin, Gin, Bin) is determined based on the input color data (Rin, Gin, Bin), per se. Accordingly, it is possible to accurately determine the hue Hin of the input color indicated by the input color data (Rin, Gin, Bin). By executing the color compression based on the thus determined hue Hin, it is possible to eliminate color difference between colors on the input end (monitor 3) and colors on the output end (printer 4) and to attain a proper gradation.

Because the hue Hin of the input color is determined based on: the input color data (Rin, Gin, Bin); the hue values HR and HG that are calculated based on measuring results of red and green colors that are reproduced by the monitor 3 (input-end device) in response to input color image data (255, 0, 0) and (0, 255, 0) indicative of full colors of red and green; the hue value HB designated by the user as his/her desired hue for blue; and the hue values HC, HM, and HY that are calculated based on measuring results of cyan, magenta, and yellow colors that are reproduced by the printer 4 (output-end device) in response to output color image data (255, 0, 0, 0), (0, 255, 0, 0), and (0, 0, 255, 0) indicative of full colors of cyan, magenta, and yellow. Accordingly, it is possible to reproduce: red and green colors having hues the same as those of red and green full colors reproduced by the monitor 3; blue color having the user's desired hue; and cyan, magenta, and yellow colors having hues the same as those of cyan, magenta, and yellow full colors reproduced by the printer 4.

In S35, the CPU 5 calculates H=HR+(HY−HR)*k when Rin≧Gin≧Bin, calculates H=HG−(HG−HY)*k when Gin≧Rin≧Bin, calculates H=HG+(HC−HG)*k when Gin≧Bin≧Rin, calculates H=HB−(HB−HC)*k when Bin≧Gin≧Rin, calculates H=HB+(HM−HB)*k when Bin≧Rin≧Gin, or calculates H=HR−(HR+360−HM)*k when Rin≧Bin≧Gin, wherein k=(M−S)/(L−S), L, M, and S are respectively the maximum value, the intermediate value, and the minimum value among the values Rin, Gin, and Bin in the input color data (Rin, Gin, Bin). Accordingly, for each of red, green, blue, yellow, cyan, and magenta, all the input color data (Rin, Gin, Bin) that are located on the corresponding gradation line from black through a corresponding full color to white and that are inputtable in S1 will have the corresponding hue value HR, HG, HB, HY, HC, and HM. Accordingly, each gradation line will suffer from no hue deviation.

In S39, the lightness Vin is corrected based on the target lightness "target" that changes dependently on the difference between the values V0 and V02. Accordingly, it is possible to reduce the difference in impressions of colors on the monitor 3 and colors on the printer 4 due to the difference in lightness values in the gamuts Sm and Sp according to the hue.

For some hue that causes the difference between the values V0 and V02 to be smaller than or equal to the threshold T, the target lightness "target" is set as equal to the full-color lightness V02. Accordingly, the full color on the monitor 3 is reproduced by the full color on the printer 4. It is possible to reproduce the full color of the monitor 3 for the subject hue by the printer 4 as vivid as possible as desired by the user.

On the other hand, for another hue that causes the difference between the values V0 and V02 to be greater than the threshold T, the target lightness "target" is determined as a value between the values V0 and V02 as being defined by the equation of target=K*(V0−V02)+V02, wherein 0≦K≦1. Accordingly, the full color on the monitor 3 for the subject hue is reproduced by a color on the printer 4, which is different from the full color of the printer 4 but whose lightness is adjusted from that of the full color on the printer 4 toward that of the full color on the monitor 3. It is possible to reproduce the full color of the monitor 3 for the subject hue by the printer 4 without causing any difference in impressions between the original full color on the monitor 3 and the color on the printer 4.

It is possible to accurately determine the lightness Vin' in the corrected input-end gamut Sm', which has the target lightness "target" as a full-color lightness, as a lightness that corresponds to the lightness Vin in the input-end gamut Sm by calculating the equation of Vin'=Vmin+(Vin−Vmin)·(target−Vmin)/(V0−Vmin) for Vin≦V0 and by calculating the other equation of Vin'=target+(Vin−V0)·(Vmax−target)/(Vmax−V0) for Vin>V0.

It is possible to maintain gradation in gray colors that have relatively small chroma by correcting the lightness Vin into a corrected lightness Vout by calculating the equation of Vout=Vin+(Vin'−Vin)×F(X), wherein X=(Cin)/(Cmax$_{(Vin)}$), and F(X) is a function with respect to X and satisfies a condition of 0≦F(X)≦1 with respect to X that satisfies 0≦X≦1 and F(X) is a monotone increasing function which increases from 0 to 1 as X increases from 0 to 1.

In S43, the chroma Cin is corrected into Cout by calculating the equation of Cout=Cin−(Cmax'$_{(Vout)}$−CT$_{(Vout)}$)×Cin/Cmax'$_{(Vout)}$, wherein the corrected input-end gamut Sm' has the maximum chroma Cmax'$_{(Vout)}$ at the lightness Vout and at the hue Hin and the output-end gamut Sp has the maximum chroma CT$_{(Vout)}$ at the lightness Vout and at the hue Hin. It is possible to compress the chroma in the corrected input-end gamut Sm' into the chroma in the output-end gamut Sp.

In S2, the input color data set (Rin, Gin, Bin) is converted into a set of colorimetric data (Lin*, ain*, bin*). In S33, the lightness Vin and the chroma Cin of the input color data are determined based on the calorimetric data (Lin*, ain*, bin*). In S35, the hue Hin of the input color is determined based on the input color data (Rin, Gin, Bin). In S39, the lightness Vin is corrected into the corrected lightness Vout based on the hue Hin after the hue Hin has been determined in S35. In S43, the chroma Cin is corrected into the corrected chroma Cout based on the hue Hin and on the corrected lightness Vout after the corrected lightness Vout has been generated in S39. Accordingly, it is possible to perform color compression operation by properly converting lightness and chroma while preventing undesirable change of hue.

According to the hue conversion in S35 in the present embodiment, hue angles of C, M, and Y are always set to hue angles HC, HM, and HY of C, M, and Y of the printer 4, hue angles of R and G are always set to hue angles HR and HG of R and G of the monitor 3, and the hue angle of B is always set to the value HB desired by the user. The gradation from black through a full color to white is made linear in each color of R, G, B, C, M, and Y according to the hue conversion. In addition, the user sets the hue angle HB for B. Therefore, the user can obtain blue color B which provides the user's favorite hue and gradation. Every hue can be reproduced excellently and gradations can be reproduced without color shifts.

In addition, the target lightness is set to a value corresponding to the difference between the full color lightness value V0 in the color gamut Sm and the full color lightness value V02 in the color gamut Sp at the hue of inputted data. Therefore, it is possible to prevent differences in color impressions due to differences in lightness between the color gamuts Sm and Sp. According to this lightness compression, drifting of lightness (particularly in G and C) can be improved greatly.

While the invention has been described in detail with reference to the specific embodiment thereof, it would be apparent to those skilled in the art that various changes and modifications may be made therein without departing from the spirit of the invention.

For example, the value of K need not always be a fixed value but may be a function defined by V0 and V02 as follows:

$$K=\{Abs(V0−V02)/T−1\}/3$$

However, where {Abs(V0−V02)/T−1}/3<0, K=0 is forcedly set. Where {Abs(V0−V02)/T−1}/3>⅓, K=⅓ is forcedly set.

Further, the threshold value T need not always be a fixed value of 20 but may be determined in correspondence with the color reproduction characteristics of the monitor 3 and printer 4.

In the above-described embodiment, F(X) may be fixed to 1 independently from the value of X, in S39. In this case, Vin is always converted into Vout that is equal to Vin' according to equation (7). Also in this case, the chroma value Cin may be converted into a corrected chroma value Cout by using the maximum chroma values Cmax'$_{(Vin')}$ and CT$_{(Vin')}$ for Vin' in place of the chroma values Cmax'$_{(Vout)}$ and CT$_{(Vout)}$ for Vout in equation (8) in S43.

In the above-described embodiment, because the hue value Hin of the input data (Rin, Gin, Bin) is determined dependently on the input data (Rin, Gin, Bin), it is possible to prevent occurrence of hue shifts and to accomplish proper gradation. Additionally, the target lightness "target" is determined as a value that corresponds to the difference between the full-color lightness values V0 and V02 of the gamuts Sm and Sp at the hue Hin, it is possible to eliminate difference in impressions of colors due to the difference in lightness values in the color gamuts Sm and Sp.

However, as long as the hue value Hin of the input data (Rin, Gin, Bin) is determined dependently on the input data (Rin, Gin, Bin), the target lightness "target" may be determined as a value that does not correspond to the difference between the full-color lightness values V0 and V02. Still, it is possible to prevent occurrence of hue shifts during color compression and to accomplish proper gradation.

Similarly, as long as the target lightness "target" is determined as a value that corresponds to the difference between the full-color lightness values V0 and V02, the hue value Hin of the input data (Rin, Gin, Bin) may be determined not dependently on the input data (Rin, Gin, Bin), but may be determined by calculating the equation of Hin=arctan(bin*/ain*)*180/π, based on the values ain* and bin* obtained in S2. Still, it is possible to eliminate difference in impressions of colors due to the difference in lightness values in the color gamuts Sm and Sp.

In the above-described embodiment, the output data for the printer 4 is composed of four color components of cyan, magenta, yellow, and black. However, the output data for the printer 4 may be composed of three color components of cyan, magenta, and yellow.

Input data and output data are not limited to image data for a monitor or printer, but may be composed of image data for any arbitrary image processing apparatuses.

The input data does not necessarily include all the color components of red, green, and blue. The output data does not necessarily include all the color components of cyan, magenta, and yellow. When the input data includes at least one of the color components of red, green, and blue, and the output data includes at least one of the color components of cyan, magenta, and yellow, the hue Hin of the input data may be determined based on the corresponding at least one of the hue values HR, HG, and HB and based on the corresponding at least one of the hue values HC, HM, HY.

The color compression apparatus and the color compression method according to the present embodiment can be widely used in the field of image processings for controlling reproduced colors to be equal to each other between any two arbitrary devices, such as monitors, printers, digital cameras, and the like.

What is claimed is:

1. A color compression apparatus, comprising:
    an input portion receiving input color image data which is defined for an input-end device and which is located in a predetermined input-end gamut; and
    a color compression portion converting the input color image data into output color image data which is defined for an output-end device and which is located in a predetermined output-end gamut,
    the color compression portion including a hue determining portion determining hue of the input color image data based on the input color image data.

2. A color compression apparatus as claimed in claim 1, wherein the input color image data includes data of a color component of at least one of red and green,
    further comprising a storage portion storing data of at least one hue that is calculated based on a measuring result of at least one color that is reproduced by the input-end device in response to input color image data indicative of at least one of primary colors of red and green,
    wherein the hue determining portion determines the hue of the input color image data based on the input color image data and on the data of at least one hue.

3. A color compression apparatus as claimed in claim 1, wherein the input color image data includes data of a blue color component,
    further comprising a user-input portion allowing a user to input data of his/her desired hue of blue color, and
    wherein the hue determining portion determines the hue of the input color image data based on the input color image data and on the data of the user's desired hue of the blue color.

4. A color compression apparatus as claimed in claim 1, wherein the output color image data includes data of a color component of at least one of cyan, magenta, and yellow,
    further comprising a storage portion storing data of at least one hue that is calculated based on a measuring result of at least one color that is reproduced by the output-end device in response to output color image data indicative of at least one of primary colors of cyan, magenta, red, and yellow,
    wherein the hue determining portion determines the hue of the input color image data based on the input color image data and on the data of at least one hue.

5. A color compression apparatus as claimed in claim 1, wherein the input color image data includes a set of data (Rin, Gin, Bin) including color components of red, green, and blue,
    further comprising a storage portion storing data of hues HR and HG for red and green, the data of hue HR having a value that is calculated based on a measuring result of a color that is reproduced by the input-end device in response to input color image data (255, 0, 0), the data of hue HG having a value that is calculated based on a measuring result of a color that is reproduced by the input-end device in response to input color image data (0, 255, 0); and
    a user-input portion allowing a user to input data of his/her desired hue HB for blue, and
    wherein the hue determining portion determines a hue Hin of the input color image data based on the input color image data (Rin, Gin, Bin) and on the hue data HR, HG, and HB.

6. A color compression apparatus as claimed in claim 5, wherein the output color image data includes a set of data (Cout, Mout, Yout, Kout) including color components of cyan, magenta, yellow, and black,
    wherein the storage portion further stores data of hues HC, HM, and HY for cyan, magenta, and yellow, the data of hue HC having a value that is calculated based on a measuring result of a color that is reproduced by the output-end device in response to output color image data (255, 0, 0, 0), the data of hue HM having a value that is calculated based an a measuring result of a color that is reproduced by the output-end device in response to output color image data (0, 255, 0, 0), the data of hue HY having a value that is calculated based on a measuring result of a color that is reproduced by the output-end device in response to output color image data (0, 0, 255, 0), and
    wherein the hue determining portion determines the hue Hin of the input color image data based on the input color image data (Rin, Gin, Bin), on the hue data HR, HG, and HB, and on the hue data HC, HM, and HY.

7. A color compression apparatus as claimed in claim 6, wherein the hue determining portion calculates H=HR+(HY−HR)*k when Rin≧Gin≧Bin, calculates H=HG−(HG−HY)*k when Gin≧Rin≧Bin, calculates H=HG+(HC−HG)*k when Gin≧Bin≧Rin, calculates H=HB−(HB−HC)*k when Bin≧Gin≧Rin, calculates H=HB+(HM−HB)*k when Bin≧Rin≧Gin, or calculates H=HR−(HR+360−HM)*k when Rin≧Bin≧Gin, wherein k=(M−S)/(L−S), L, M, and S are respectively the maximum value, the intermediate value, and the minimum value among the values Rin, Gin, and Bin in the input color image data (Rin, Gin, Bin).

8. A color compression apparatus, comprising:
    an input portion receiving input color image data which is defined for an input-end device and which is located in a predetermined input-end gamut; and
    a color compression portion converting the input color image data into output color image data which is defined for an output-end device and which is located in a predetermined output-end gamut,
    the color compression portion including:
        a hue determining portion determining hue Hin of the input color image data;
        a lightness determining portion determining lightness Vin of the input color image data; and
        a lightness correcting portion correcting the lightness Vin;
        the input-end gamut having a full-color lightness V0 at the hue Hin, and the output-end gamut having a full-color lightness V02 at the hue Hin,
        the lightness correcting portion including a target lightness determining portion determining, based on a difference between the values V0 and V02, a target lightness "target" indicative of a full-color lightness of a corrected input-end gamut at the hue Hin, the lightness correcting portion correcting the lightness Vin based on the target lightness "target".

9. A color compression apparatus as claimed in claim 8, wherein the lightness determining portion determines the target lightness "target" as equal to the full-color lightness V02 when the difference between the values V0 and V02 is smaller than or equal to a predetermined threshold value.

10. A color compression apparatus as claimed in claim 9, wherein the lightness determining portion determines the target lightness "target" as a value between the values V0 and V02 when the difference between the values V0 and V02 is greater than the predetermined threshold value.

11. A color compression apparatus as claimed in claim 10, wherein the lightness determining portion determines, when the difference between the values V0 and V02 is greater than the predetermined threshold value, the target lightness "target" by calculating an equation of target=K*(V0−V02)+V02, wherein 0≦K≦1.

12. A color compression apparatus as claimed in claim 11, wherein the input-end gamut has a maximum lightness value Vmax and a minimum lightness value Vmin at the hue Hin,
  wherein the lightness correcting portion calculates a lightness Vin' in the corrected input-end gamut that corresponds to the lightness Vin in the input-end gamut by calculating an equation of Vin'=Vmin+(Vin−Vmin)·(target−Vmin)/(V0−Vmin) when Vin≦V0 or by calculating another equation of Vin'=target+(Vin−V0)·(Vmax−target)/(Vmax−V0) when Vin>V0.

13. A color compression apparatus as claimed in claim 12, further comprising a chroma determining portion determining a chroma Cin of the input color image data,
  wherein the input-end gamut has a maximum chroma $Cmax_{(Vin)}$ at the lightness Vin and at the hue Hin,
  wherein the lightness correcting portion corrects the lightness Vin into a corrected lightness Vout by calculating an equation of Vout=Vin+(Vin'−Vin)×F(X), wherein X=(Cin)/($Cmax_{(Vin)}$), and F(X) is a function with respect to X and satisfies a condition of 0≦F(X)≦1 with respect to X that satisfies 0≦X≦1 and F(X) is a monotone increasing function which increases from 0 to 1 as X increases from 0 to 1.

14. A color compression apparatus as claimed in claim 13, wherein the corrected input-end gamut has a maximum chroma $Cmax'_{(Vout)}$ at the lightness Vout and at the hue Hin,
  wherein the output-end gamut has a maximum chroma $CT_{(Vout)}$ at the lightness Vout and at the hue Hin,
  wherein the color compressing portion further includes a chroma correcting portion correcting the chroma Cin, and
  wherein the chroma correcting portion calculates an equation of Cout=Cin−($Cmax'_{(Vout)}$−$CT_{(Vout)}$)×Cin/$Cmax'_{(Vout)}$.

15. A color compression apparatus as claimed in claim 8, wherein the input portion receives a set of input color image data (Rin, Gin, Bin),
  wherein the color compressing portion further includes a converting portion converting the input color image data set (Rin, Gin, Bin) into a set of calorimetric data (Lin*, ain*, bin*),
  wherein the lightness determining portion determines the lightness Vin of the calorimetric data set (Lin*, ain*, bin*),
  wherein the color compressing portion includes a chroma determining portion determining the chroma Cin of the calorimetric data set (Lin*, ain*, bin*),
  wherein the hue determining portion determines the hue Hin of the input color image data directly based on the input color image data set (Rin, Gin, Bin),
  wherein the lightness correcting portion corrects the lightness Vin into a corrected lightness Vout based on the hue Hin after the hue Hin has been determined, and
  wherein the color compressing portion further includes a chroma correcting portion correcting the chroma Cin based on the hue Hin and on the corrected lightness Vout after the corrected lightness Vout has been generated.

16. A color compression method, comprising:
  receiving input color image data which is defined for an input-end device and which is located in a predetermined input-end gamut; and
  converting the input color image data into output color image data which is defined for an output-end device and which is located in a predetermined output-end gamut,
  the color compression step including:
    determining hue of the input color image data based on the input color image data.

17. A color compression method as claimed in claim 16, wherein the input color image data includes data of a color component of at least one of red and green,
  wherein the hue determining step determines the hue of the input color image data based on the input color image data and on data of at least one hue that is calculated based on a measuring result of at least one color that is reproduced by the input-end device in response to input color image data indicative of at least one of primary colors of red and green.

18. A color compression method as claimed in claim 16, wherein the input color image data includes data of a blue color component,
  wherein the hue determining portion determines the hue of the input color image data based on the input color image data and on data of a user's desired hue of the blue color designated by the user.

19. A color compression method as claimed in claim 16, wherein the output color image data includes data of a color component of at least one of cyan, magenta, and yellow,
  wherein the hue determining step determines the hue of the input color image data based on the input color image data and on data of at least one hue that is calculated based on a measuring result of at least one color that is reproduced by the output-end device in response to output color image data indicative of at least one of primary colors of cyan, magenta, red, and yellow.

20. A color compression method as claimed in claim 16, wherein the input color image data includes a set of data (Rin, Gin, Bin) including color components of red, green, and blue, and
  wherein the hue determining step determines a hue Hin of the input color image data based on the input color image data (Rin, Gin, Bin) and on hue data HR, HG, and HB of red, green, and blue,
  the data of hue HR having a value that is calculated based on a measuring result of a color that is reproduced by the input-end device in response to input color image data (255, 0, 0),
  the data of hue HG having a value that is calculated based on a measuring result of a color that is reproduced by the input-end device in response to input color image data (0, 255, 0), and
  the data of the hue HB having a value of a user's desired hue for blue, which is designated by the user.

21. A color compression method as claimed in claim 20, wherein the output color image data includes a set of data (Cout, Mout, Yout, Kout) including color components of cyan, magenta, yellow, and black,
  wherein the hue determining step determines the hue Hin of the input color image data based on the input color image data (Rin, Gin, Sin), on the hue data HR, HG, and HB, and on hue data HC, HM, and HY for cyan, magenta, and yellow,
  the data of hue HC having a value that is calculated based on a measuring result of a color that is reproduced by the output-end device in response to output color image data (255, 0, 0, 0), the data of hue HM having a value that is calculated based on a measuring result of a color that is reproduced by the output-end device in response to output color image data (0, 255, 0, 0), and the data of hue HY having a value that is calculated based on a measuring result of a color that is reproduced by the output-end device in response to output color image data (0, 0, 255, 0).

22. A color compression method as claimed in claim 21, wherein the hue determining step calculates H=HR+(HY−HR)*k when Rin≧Gin≧Bin, calculates H=HG−(HG−HY)*k when Gin≧Rin≧Bin, calculates H=HG+(HC−HG)*k when Gin≧Bin≧Rin, calculates H=HB−(HB−HC)*k when Bin≧Gin≧Rin, calculates H=HB+(HM−HB)*k when Bin≧Rin≧Gin, or calculates H=HR−(HR+360−HM)*k when Rin≧Bin≧Gin, wherein k=(M−S)/(L−S), L, M, and S are respectively the maximum value, the intermediate value, and the minimum value among the values Rin, Gin, and Bin in the input color image data (Rin, Gin, Bin).

23. A color compression method, comprising:
receiving input color image data which is defined for an input-end device and which is located in a predetermined input-end gamut; and
converting the input color image data into output color image data which is defined for an output-end device and which is located in a predetermined output-end gamut, the color compression step including:
determining hue Hin of the input color image data;
determining lightness Vin of the input color image data; and
correcting the lightness Vin;
the input-end gamut having a full-color lightness V0 at the hue Hin, and the output-end gamut having a full-color lightness V02 at the hue Hin,
the lightness correcting step including:
determining, based on a difference between the values V0 and V02, a target lightness "target" indicative of a full-color lightness of a corrected input-end gamut at the hue Hin, the lightness correcting step correcting the lightness Vin based on the target lightness "target".

24. A color compression method as claimed in claim 23, wherein the lightness determining step determines the target lightness "target" as equal to the full-color lightness V02 when the difference between the values V0 and V02 is smaller than or equal to a predetermined threshold value.

25. A color compression method as claimed in claim 24, wherein the lightness determining step determines the target lightness "target" as a value between the values V0 and V02 when the difference between the values V0 and V02 is greater than the predetermined threshold value.

26. A color compression method as claimed in claim 25, wherein the lightness determining step determines, when the difference between the values V0 and V02 is greater than the predetermined threshold value, the target lightness "target" by calculating an equation of target=K*(V0−V02)+V02, wherein 0≦K≧1.

27. A color compression method as claimed in claim 26, wherein the input-end gamut has a maximum lightness value Vmax and a minimum lightness value Vmin at the hue Hin,
wherein the lightness correcting step calculates a lightness Vin' in the corrected input-end gamut that corresponds to the lightness Vin in the input-end gamut by calculating an equation of Vin'=Vmin+(Vin−Vmin)·(target−Vmin)/(V0−Vmin) when Vin≦V0 or by calculating another equation of Vin'=target+(Vin−V0)·(Vmax−target)/(Vmax−V0) when Vin≦V0.

28. A color compression method as claimed in claim 27, further comprising a chroma determining step determining a chroma Cin of the input color image data,
wherein the input-end gamut has a maximum chroma $Cmax_{(Vin)}$ at the lightness Vin and at the hue Hin,
wherein the lightness correcting step corrects the lightness Vin into a corrected lightness Vout by calculating an equation of Vout=Vin+(Vin'−Vin)×F(X), wherein X=(Cin)/($Cmax_{(Vin)}$), and F(X) is a function with respect to X and satisfies a condition of 0≦F(X)≦1 with respect to X that satisfies 0≦X≦1 and F(X) is a monotone increasing function which increases from 0 to 1 as X increases from 0 to 1.

29. A color compression method as claimed in claim 28, wherein the corrected input-end gamut has a maximum chroma $Cmax'_{(Vout)}$ at the lightness Vout and at the hue Hin,
wherein the output-end gamut has a maximum chroma $CT_{(Vout)}$ at the lightness Vout and at the hue Hin,
wherein the color compressing step further includes a chroma correcting step correcting the chroma Cin, and
wherein the chroma correcting step calculates an equation of Cout=Cin−($Cmax'_{(Vout)}$−$CT_{(Vout)}$)×Cin/$Cmax'_{(Vout)}$.

30. A color compression method as claimed in claim 23, wherein the input step receives a set of input color image data (Rin, Gin, Bin),
wherein the color compressing step further includes a converting step converting the input color image data set (Rin, Gin, Bin) into a set of colorimetric data (Lin*, ain*, bin*),
wherein the lightness determining step determines the lightness Vin of the colorimetric data set (Lin*, ain*, bin*),
wherein the color compressing step includes a chroma determining step determining the chroma Cin of the calorimetric data set (Lin*, ain*, bin*),
wherein the hue determining step determines the hue Hin of the input color image data directly based on the input color image data set (Rin, Gin, Bin),
wherein the lightness correcting step corrects the lightness Vin into a corrected lightness Vout based on the hue Hin after the hue Hin has been determined, and
wherein the color compressing step further includes a chroma correcting step correcting the chroma Cin based on the hue Hin and on the corrected lightness Vout after the corrected lightness Vout has been generated.

* * * * *